US012688389B2

(12) United States Patent
Luksenberg et al.

(10) Patent No.: US 12,688,389 B2
(45) Date of Patent: Jul. 21, 2026

(54) METHODS AND APPARATUSES FOR CREATING AND USING A WIRELESS TAG

(71) Applicant: Comcast Cable Communications, LLC, Philadelphia, PA (US)

(72) Inventors: David Luksenberg, Philadelphia, PA (US); Gaurav Naik, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/978,899

(22) Filed: Dec. 12, 2024

(65) Prior Publication Data

US 2026/0170286 A1     Jun. 18, 2026

(51) Int. Cl.
*G06K 19/07*          (2006.01)
*G06K 7/00*           (2006.01)
(52) U.S. Cl.
CPC ....... *G06K 19/0702* (2013.01); *G06K 7/0008* (2013.01); *G06K 19/0723* (2013.01)
(58) Field of Classification Search
CPC ............. G06K 19/0702; G06K 7/0008; G06K 19/0723
USPC ........................................................ 235/492
See application file for complete search history.

(56) References Cited

U.S. PATENT DOCUMENTS

| | | | |
|---|---|---|---|
| 6,409,401 B1 | 6/2002 | Petteruti et al. | |
| 6,863,220 B2 | 3/2005 | Selker | |
| 7,842,152 B2 * | 11/2010 | Hamilton ............... | G06K 17/00 156/227 |
| 8,063,783 B2 * | 11/2011 | Miyashita .......... | G06K 17/0025 235/487 |
| 8,624,740 B2 | 1/2014 | Sweeney | |
| 9,471,817 B1 * | 10/2016 | Alhazme ............ | G06K 19/0716 |
| 10,002,321 B2 | 6/2018 | Sandock et al. | |
| 10,019,665 B2 | 7/2018 | Krishna et al. | |
| 2007/0115129 A1 * | 5/2007 | Kessler ............ | G06K 19/07345 340/572.3 |
| 2007/0144662 A1 * | 6/2007 | Armijo ............. | H01L 23/49855 257/E23.176 |
| 2007/0152828 A1 | 7/2007 | Mohalik | |
| 2007/0257798 A1 | 11/2007 | Ford et al. | |
| 2009/0230797 A1 | 9/2009 | Park | |
| 2019/0258916 A1 * | 8/2019 | Omori ............... | G06K 19/0775 |

* cited by examiner

*Primary Examiner* — Ahshik Kim
(74) *Attorney, Agent, or Firm* — Ballard Spahr LLP

(57)          ABSTRACT

Systems, methods and apparatuses are described for creating, activating, monitoring and/or programming an RFID tag. The RFID tag may include a power activation circuit that, when opened, allows the RFID tag to draw power, or additional power, from a battery. The RFID tag may include one or more contacts that may be altered in different combinations to provide programming instructions to the RFID tag.

20 Claims, 13 Drawing Sheets

300

500

XYZ1212121

600

604

602

XYZ1212121

614

608  607

615

612

606

610

A                                                                    A 616    624    614                            604

607    602

620

618

622

626

700

710
RECEIVE A FIRST WIRELESS TAG

720
RECEIVE A SECOND WIRELESS TAG ATTACHED TO THE FIRST WIRELESS TAG

730
DETACH THE FIRST WIRELESS TAG FROM THE SECOND WIRELESS TAG

740
CAUSE A BATTERY OF THE FIRST WIRELESS TAG TO PROVIDE ELECTRICAL POWER TO THE FIRST WIRELESS TAG

1200

1210

RECEIVE A WIRELESS TAG COMPRISING A PROGRAMMING  CONTACT

1220

COMPRESS A PORTION OF THE PROGRAMMING CONTACT A PLURALITY OF TIMES TO ENCODE AT LEAST A PORTION OF THE WIRELESS TAG

METHODS AND APPARATUSES FOR CREATING AND USING A WIRELESS TAG

BACKGROUND

Wireless tags, such as active radio frequency identification (RFID) tags are getting so small, thin, and flexible that the components of the RFID tag can be embedded in a printable support base (e.g., an RFID label). These RFID tags may be used for inventory tracking, asset tracking, or labeling packages for delivery. Active RFID tags are an improvement over previously used passive RFID tags. The power source included in active RFID tags, which is not included in passive RFID tags, allows for improved tracking and identification range. In addition, monitoring of assets with active RFID tags may be significantly easier and cheaper because active RFID tag monitoring requires a lesser amount of fixed infrastructure to monitor a given area.

However, there are some drawbacks to the use of active RFID tags. Active RFID tags rely on the included power source to transmit data from the RFID tag and be detected by a corresponding RFID reader. As such, the RFID tag is only useful for the amount of time that the power source is providing power to the RFID tag. Activating the RFID tag and associating the tag with an asset (e.g., a pallet, container, or the like) also need improvement. These and other concerns associated with creating and using RFID tags are identified and addressed herein.

SUMMARY

It is to be understood that both the following general description and the following detailed description are exemplary and explanatory only and are not restrictive. A radio frequency identification (RFID) tag and methods and systems for creating, activating, associating and/or programming the RFID tag are shown and described. The RFID tag may include a power activation circuit that, when opened, permits the RFID tag to draw power or draw more power so that the RFID tag is able to transmit a signal. The circuit may be opened when the RFID tag (e.g., a support base or label of the RFID tag) is separated from an adjacent RFID tag (e.g., an adjacent support base or label for the adjacent RFID tag, such as when the RFID tag is being applied to a device, container, or the like. The RFID tag may include one or more contacts that are electrically coupled to a circuit of the RFID tag. The one or more contacts may be compressed or not compressed in different combinations to provide additional programming and battery power for the RFID tag.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein.

DETAILED DESCRIPTION

Figure 1:
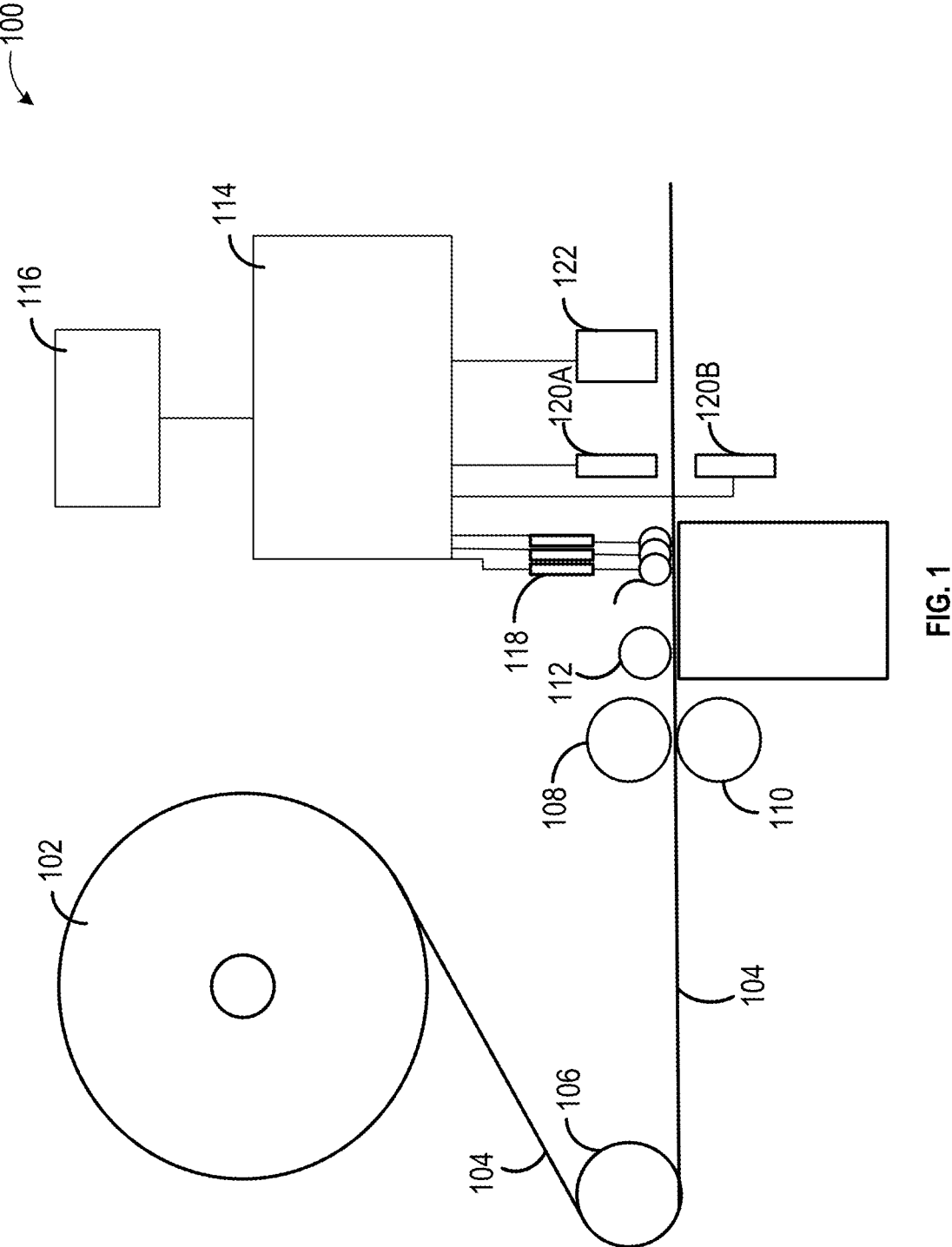
FIG. 1 shows a system for preparing an RFID tag.

Before the present methods and systems are described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise.

"Optional" or "optionally" means that the subsequently described element, feature, event, or circumstance may or may not be included or occur, and that the description includes cases where said element, feature, event, or circumstance is included or occurs and cases where it is not included or does not occur.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, elements and features in described apparatuses and steps in described methods. Thus, if there are a variety of additional steps that may be performed or elements and features that may be included or substituted, it is understood that each of these additional steps may be performed or elements and features may be included or substituted with any specific configuration or combination of configurations of the described methods and apparatuses.

The present apparatuses and methods may be understood more readily by reference to the following detailed description and the examples included therein and to the Figures and their previous and following description. As will be appreciated by one skilled in the art, the methods described herein may be implemented by an apparatus that may take the form of an entirely hardware embodiment and/or an entirely software embodiment and/or an embodiment combining software and hardware aspects. Furthermore, the methods described herein may take the form of a computer program product on a computer-readable storage medium (e.g., non-transitory) having computer-readable program instructions (e.g., computer software) embodied in the storage medium. More particularly, the methods described herein may be implemented by an apparatus that may take the form of web-implemented computer software. Any suitable computer-readable storage medium may be utilized including hard disks, CD-ROMs, optical storage devices, flash memory internal or removable storage devices, or magnetic storage devices.

Throughout this application reference is made to block diagrams. It will be understood that each block of the block diagrams, and combinations of blocks in the block diagrams, respectively, may be implemented in a number of different ways. Accordingly, blocks of the block diagrams support one or a combinations of devices for performing the specified functions.

Examples of the apparatuses, methods, and systems are described below with reference to block diagrams and flowchart illustrations of methods. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory (e.g., non-transitory) that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus, such as a RFID label printer or programmer, to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose, hardware-based computer systems that perform the specified functions or steps, or combinations of special purpose hardware and computer instructions.

FIG. 1 shows a system 100 for preparing one or more RFID tags. For example, the system 100 may activate a battery to provide power to the RFID tag disposed on a support base (e.g., RFID label, base, substructure, tag carrier, etc.) as described in greater detail below. For example, the system 100 may program a portion of the RFID tag. For example, the system 100 may facilitate the association of RFID tag data with information on or associated with the support base.

The system 100 may include a plurality of wireless tags 104 (e.g., a plurality of wireless RFID tags). Each wireless tag 104 may include a support base, base, substructure, label, or tag carriers for supporting components of the respective wireless tags 104. Hereinafter the term support base will be used in the description for brevity, however, the support structure of each wireless tag 104 may also be referred to as a base, substructure, label or tag carrier. For example, the wireless tags 104 may be any of the wireless tags described in FIGS. 2A-6B below. For example, the wireless tags 104 may be provided to the system in any form. For example, the wireless tags 104 may be provided to the system 100 in the form of a wireless tag carrier 102 (e.g., a roll, pallet, or string of a plurality of wireless tags 102). While the examples below will describe the wireless tag carrier 102 as a roll of a plurality of wireless tags 102 this is for example purposes only and other forms of wireless tag carriers 102 that provide multiple wireless tags for processing may be substituted for the roll of the plurality of wireless tags 102. In other examples, the wireless tags 104 may be provided to the system 100 in another format. Each wireless tag 104 may comprise circuitry and an antenna for wireless communication. Each wireless tag 104 may comprise an adhesive layer provided along a bottom side of the wireless tag 104. Each wireless tag 104 may comprise a backing layer. The backing layer may be provided along a bottom side of the adhesive layer. The backing layer may be configured to be manually or automatically removable from the adhesive layer. Removing the backing layer may expose the adhesive layer and permit the adhesive layer to couple the wireless tag 104 to another object, such as a package, a pallet, a container, a piece of equipment, a vehicle, or the like. For example, a support base of the wireless tag 104 may be made of paper, plastic, a polymer, or any other type of material. For example, the circuitry and antenna may be disposed on the top side of the wireless tag 104 or encapsulated within a portion of the wireless tag 104.

The wireless tag 104 may be an active RFID tag that has not been activated in its initial state on the roll of wireless tags 102. The wireless tag 104 may comprise a substrate. For example, the substrate may be made of a rigid or flexible material. For example, the substrate may comprise one or more of plastic, poly-vinyl chloride, a polymer, polyethylenetherephtalate (PET) phenolics, polyesters, styrene, etc. For example, a bottom side of the substrate may comprise an adhesive material or layer for coupling the substrate to the wireless tag 104.

The wireless tag 104 may comprise a circuit. For example, the circuit may be disposed on the substrate of the wireless tag 104. For example, the circuit may comprise an integrated circuit. For example, the circuit may comprise an electronic circuit, microchip, or chip. For example, the circuit may comprise a logic unit that is programmed to operate the wireless tag 104. For example, the logic unit of the circuit may be configured to receive additional programming or to have its program modified. For example, certain elements of the system 100 may be configured to program the logic unit or modify the programming of the logic unit of the circuit. For example, the logic unit may further comprise memory to store data associated with the wireless tag 104 and/or for operating the wireless tag 104. For example, the memory may comprise read-only memory (ROM) and/or random access memory (RAM). For example, the memory may comprises electrically erasable, programmable read-only memory (EEPROM). For example, data stored within the memory may include any one or more of a tag identifier (ID), label information, an object ID, password, or error detection code.

The wireless tag 104 may comprise an antenna. For example, the antenna may be communicably coupled to the circuit. For example, all or at least a portion of the antenna may be disposed on or in the substrate of the wireless tag 104. For example, the antenna may be disposed on the substrate via etching, stamping, or screen printing. For example, the wireless tag may comprise multiple antennas. For example, the antenna may facilitate communication between the circuit and another device. For example, the antenna may transmit data provided by the circuit to the other device. For example, the antenna may transmit the data and/or receive other data wirelessly via a radio transmission. For example, the antenna may be configured to transmit and receive information at a particular frequency or within a predetermined frequency range. For example, the antenna may have any form or shape. For example, the antenna may be in the shape of a spiral coil, a single dipole, dual dipoles, a folded dipole or the like. For example, the antenna may be metal, such as copper, aluminum, silver, or any other type of metal.

The wireless tag 104 may comprise a battery. The battery may be disposed on and/or coupled to the substrate. The battery may be configured to provide electrical power to the circuit for operating the circuit and for transmitting and receiving data via the antenna. The battery may be any known type of battery. For example, the battery may be any one of a lithium-ion battery, a lithium-thionyl chloride battery, a nickel-cadmium battery, silver oxide battery, zinc-carbon battery, or an alkaline battery.

For example, the wireless tag 104 may comprise a power activation circuit. The power activation circuit may have a first end, a second end, and a circuit trace that extends from the first end to the second end. For example, the first end may be coupled or electrically coupled to a first portion of the circuit and the second end may be coupled or electrically coupled to a second portion of the circuit. For example, the first portion and the second portion may be the same or a different part of the circuit. The circuit trace of the power activation circuit may extend away from the circuit. For example, the circuit trance may along the support base of the wireless tag 104 and to a second wireless tag (e.g., a second wireless RFID tag) that is coupled or attached to the wireless tag 104. For example, the second wireless tag may be positioned adjacent to the wireless tag 104. For example, the circuit trace may extend along a portion of a support base for the second wireless tag. For example, the power activation circuit may be a closed circuit when the wireless tag 104 is attached to the second wireless tag. In the closed circuit configuration, the power activation circuit may prevent the circuit from drawing power from the battery. For example, detaching the wireless tag 104 from the second wireless tag may cause the power activation circuit to open. In the open configuration, the circuit may draw power from the battery. For example, opening the power activation circuit may activate the circuit, allow the circuit to draw power (or more power) from the battery, and allow the circuit to begin transmitting data.

For example, the wireless tag 104 may comprise another form of power activation circuit. For example, the power activation circuit may comprise a first contact electrically coupled to the circuit and a second contact electrically coupled to the circuit. For example, each of the first contact and the second contact may be made of conductive material. For example, the first contact may be positioned vertically above the second contact. For example, each of the first contact and the second contact may be disposed along a portion of the support base of the wireless tag 104 distal from the circuit. For example, the first contact may be electrically coupled to the circuit via a first electrical trace and the second contact may be electrically coupled to the circuit via a second electrical trace. For example, the power activation circuit may initially be in an open circuit configuration whereby the first contact and the second contact are not touching or abutting one another. For example, in the open circuit configuration the power activation circuit may have an air gap between the first contact and the second contact. For example, in the open circuit configuration, the power activation circuit may have a nonconductive material disposed between the first contact and the second contact. For example, the nonconductive material may comprise an adhesive. In the open circuit configuration, the power activation circuit may prevent or limit the circuit from drawing power from, or otherwise the circuit may not be able to draw power (or may only be able to draw minimal power) from, the battery. A portion of the system 100 may be configured to apply a force onto a portion of the wireless tag 104 where the first contact is located. The force may comprise a force in the downward direction. The force may cause the first contact to move downward and into contact with the second contact, thereby causing the power activation circuit to be in a closed circuit configuration. In the closed circuit configuration, the circuit may draw power (or more power) from the battery. For example, closing the power activation circuit may activate the circuit, allow the circuit to draw power (or more power) from the battery, and allow the circuit to begin transmitting data.

The wireless tag 104 may comprise one or a plurality of programming contacts. The programming contacts may operate as a binary programming system whereby if the contacts are open they provide a first programing value (e.g., 0) and if the contacts are closed, they provided a second programming value (e.g., 1). Each programming contact may be electrically and communicably coupled to the circuit. For example, each programming contact may be electrically and communicably coupled to the circuit via one or more electrical traces. For example, each programming contact may be disposed along a portion of the support base of the wireless tag 104 distal from the circuit. Each programming contact may be made of a deformable or compactable material that when compressed or deformed causes the respective programming contact to close and changes the programming value of the respective programming contact from the first programming value to the second programming value. The programming contacts may provide information about the wireless tag 104, such as the information on or associated with the support base (e.g., information printed on the support base such as contextual information, a description or an identifier, such as label information or a label ID). The programming contacts may also provide operating instructions for the circuit. The operating instructions can be any one or more of how often or period for transmitting data, period for receiving and recording values of a sensor in communication with the circuit, instructions as to which sensors to operate and/or not operate, timing or period when the RFID tag should be in a sleep or low-power mode, etc. For example, a portion of the system 100 may be configured to apply a force onto a portion of the wireless tag 104 where one or more of the programming contacts is located. The force may comprise a force in the downward direction. The force may cause one or more of the programming contacts to be compressed or deformed, thereby causing the respective programming contact to close and change the programming value of the respective programming contact from the first programming value to the second programming value.

The wireless tag 104 may comprise a single programming contact. The programming contact may operate as a binary programming system whereby if the contact is open it provides a first programing value (e.g., 0) and if the contact is closed, it provides a second programming value (e.g., 1). The programming contact may be electrically and communicably coupled to the circuit. For example, the programming contact may be electrically and communicably coupled to the circuit via one or more electrical traces. For example, the programming contact may be disposed along a portion of the support base for the wireless tag 104 distal from the circuit. The programming contact may comprise a first contact pad and a second contact pad. The first and second contact pads may be separated by an air gap to initially be in an open configuration. The programming contact may comprise a spring or other biasing or resilient material that maintains the programming contact in the open configuration absent a force being applied. For example, a first end of the spring may be coupled to the first contact pad and the second end of the spring may be coupled to the second contact pad. For example, the spring may be a compression spring. For example, the spring may be nonconductive. For example, a force may be applied to one of the contact pads to compress the spring and allow the first contact pad to contact and electrically couple with the second contact pad, thereby closing the programming contact and changing the programming value for the programming contact from the first programming value to the second programming value. When the force is no longer applied, the spring may cause the first contact pad to separate from the second contact pad, opening the programming contact, and changing the programming value for the programming contact from the second programming value to the first programming value. The process of opening and closing the programming contact via the application and removal of force may occur a plurality of times, allowing for a substantial amount of programming code to be provided to the circuit. The programming contact may provide information about the wireless tag 104, such as the information provided on or associated with the support base (e.g., label information or label ID). The programming code provided via the programming contact may also provide operating instructions for the circuit. The operating instructions can be any one or more of how often or period for transmitting data, period for receiving and recording values of a sensor in communication with the circuit, instructions as to which sensors to operate and/or not operate, timing or period when the wireless tag 104 should be in a sleep or low-power mode, etc. For example, a portion of the system 100 may be configured to apply a force and remove the force a plurality of times along a portion of the wireless tag 104 where the programming contact is located. The force may comprise a force in the downward direction. The force may be greater than the spring force of the spring or other resilient material. The force may cause the first contact pad to move downward towards and into contact with the second contact pad, thereby causing the programming contact to close and change the programming value of the programming contact from the first programming value to the second programming value.

The wireless tag 104 may further comprise a sensor. For example, the sensor may be disposed on the substrate or circuit of the wireless tag 104 or disposed along a portion of the support base distal from the circuit. The sensor may be electrically and communicably coupled to the circuit of the wireless tag 104. The sensor may be configured to sense an input from the system 100. For example, the input may be one or more of a light input, a temperature input, a force input, or the like. For example, the sensor may comprise one or more of a pressure sensitive resistor, a strain gauge, a pressure sensor, an optical sensor (e.g., a photodiode). For example, the sensor may operate as a binary programming system for the circuit of the wireless tag 104, whereby if the sensor does not sense an input it provides a first programing value (e.g., 0) and if the sensor senses and input, the sensor provides a second programming value (e.g., 1). The process of receiving and not receiving the input may occur a plurality of times, allowing for a substantial amount of programming code to be provided to the circuit. The sensor may provide information about the information on or associated with the support base, such as the information or identifier printed on the support base (e.g., label ID). The programming code provided via the sensor may also provide operating instructions for the circuit. The operating instructions may be any one or more of how often or period for transmitting data, period for receiving and recording values of a sensor in communication with the circuit, instructions as to which sensors to operate and/or not operate, timing or period when the wireless tag 104 should be in a sleep or low-power mode, etc. For example, a portion of the system 100 may be configured to provide the input and not provide the input to the sensor a plurality of times.

The wireless tag 104 may comprise indicia of a tag ID for the RFID tag. For example, the indicia of the tag ID may be provided along a top surface of the wireless tag 104 (e.g., a top surface of the support base of the wireless tag 104). For example, the indicia may comprise dots, dashes, lines, a QR code, a bar code, alphanumeric characters or any other types of markings. The system 100 may be configured to detect and determine the tag ID from the indicia and associate it with the label information.

The wireless tags 104 may be unrolled from the roll 102 in the form of a web for printing and processing the wireless tags 104. The system 100 may comprise one or more tensioning rollers 106 for routing web of wireless tags 104 through the process and for keeping a desired amount of tension in the web of wireless tags 104. While the example of FIG. 1 only shows a single tensioning roller 106 this is for example purposes only, as additional tensing rollers are contemplated as part of this disclosure.

The system 100 may comprise one or more print heads 108. The one or more print heads 108 may be configured to print ink onto a top surface of the wireless tag 104. For example, the print heads 108 may be configured to print the label information on the top surface of the wireless tag 104 (e.g., a top surface of the support base). For example, the label information may comprise the label ID for the particular wireless tag 104. The label ID may be a unique identifier that distinguishes the respective wireless tag 104 from all other wireless tags. The one or more print heads 108 may also comprise a heat source. The heat source may be configured to dry the ink deposited on the surface of the wireless tag 104. For example, the heat source may also melt the nonconductive adhesive disposed on the second contact pad as discussed with reference to FIGS. 4A-C below. The system 100 may comprise a press roller 110. The press roller 110 may be positioned below and/or adjacent to the one or more print heads 108. The press roller 110 may be configured to maintain the web of wireless tags 104 at a desired distance from the one or more print heads 108 during the printing process.

The system 100 may comprise a battery tamper 112. For example, the battery tamper 112 may be a tamping roll. The battery tamper 112 may be configured to apply a force on to one of the contact pads of the power activation circuit as described in FIGS. 3A-4C below. For example, the battery tamper 112 may be configured to roll along the top surface of the wireless tag 104 and apply a force on to the first contact pad until it touches or abuts the second contact pad of the power activation circuit. For example, the battery tamper 112 may comprises a fluidicly-powered cylinder for raising and lowering the battery tamper 112 off of the web of wireless tags 104 when the contact pads of the power activation circuit are not being compressed together. For example, the cylinder or a control module for the cylinder may be communicably coupled to the computing device 114. For example, the cylinder or control module may receive signals from the computing device 114 that instruct when the battery tamper 112 is to be applied to the web of wireless tags 104.

The system 100 may comprise one or more contact tampers 118. For example, each of the one or more contact tampers 118 may be a tamping roll. The contact tamper 118 may be configured to apply a force on to one of the programming contacts as described in FIGS. 3A-5B below. For example, the contact tamper 118 may be configured to roll along the top surface of the wireless tag 104 and apply a force on to one or more programming contacts to deform or compress the programming contact or to move downward a pad of the programming contact until it touches or abuts the second pad of the programming contact. For example, one or more of the one or more contact tampers 118 may be coupled to one of one or more fluidicly-powered cylinders for raising and lowering the contact tamper 118 off of the web of wireless tags 104 when the programming contacts are not being compressed together. For example, each of the one or more cylinders or a control module for each of the one or more cylinders may be communicably coupled to the computing device 114. For example, the cylinder or control module may receive signals from the computing device 114 that instruct when the battery tamper 112 is to be applied to the web of wireless tags 104.

The system 100 may comprise one or more optical scanners 120A-B. For example, a first optical scanner 120A may be configured to scan a top surface of the wireless tag 104 (e.g, a top surface of the support base) and a second optical scanner 120B may be configured to scan a bottom surface of the wireless tag 104 (e.g., the backing layer and/or adhesive layer beneath the support base). For example, the optical scanners 120A-B may be configured to detect changes in shade or color along the RFID label (e.g., such as which portions of the adhesive layer of the RFID label 104 are covered by a backing material and which portions are not). For example the optical scanners 120A-B may be configured to use optical character recognition to detect alphanumeric characters, lines, shapes, QR codes, bar codes, and the like along a surface of the wireless tag 104 (e.g., along a surface of the support base). The optical scanners 120A-B may be communicably coupled to the computing device 114. For example, the optical scanners 120A-B can detect or determine the label information on the surface of the wireless tag 104. For example, the optical scanners 120A-B may detect the indicia of the tag ID for the wireless tag 104 on or within the particular wireless tag 104. For example, the optical scanners 120A-B may transmit or send the label information and the indicia of the tag ID for the wireless tag 104 to the computing device 114 so that the label information and the indicia of the tag ID may be associated with one another and stored in memory (e.g., a database).

The system 100 may comprise a wireless tag programming system 122. The wireless tag programming system 122 may be communicably coupled to the computing device 114. The wireless tag programming system 122 may receive instructions for programming at least a portion of the circuit of the wireless tag 104. The wireless tag programming system 122 may be configured to provide or generate an input that may be detected by a sensor on the wireless tag 104. For example, the input may be one or more of a light input, a temperature input, a force input, or the like. For example, the wireless tag programming system 122 may comprise one or more of a light source, a heat source, a tamping device, or other similar mechanism for generating an input to be detected by the sensor.

The system 100 may comprise a user interface 116. The user interface 116 may be communicably coupled to the computing device 114. A user may enter commands and information into the system 100 (e.g., the computing device 114) via the user interface 116. The user interface may comprise one or more of a keyboard, pointing device (e.g., a computer mouse, remote control), a microphone, a joystick, tactile input devices such as gloves, and other body coverings, motion sensor, and the like The user interface 116 may be connected to the one or more processors of the computing device 114 via a human machine interface. The user interface 116 may comprise a display device. It is contemplated that the system 100 may have more than one display device. The display device may be a monitor, an LCD (Liquid Crystal Display), light-emitting diode (LED) display, monitor, or the like.

Figures 2A, 2B, 2C:
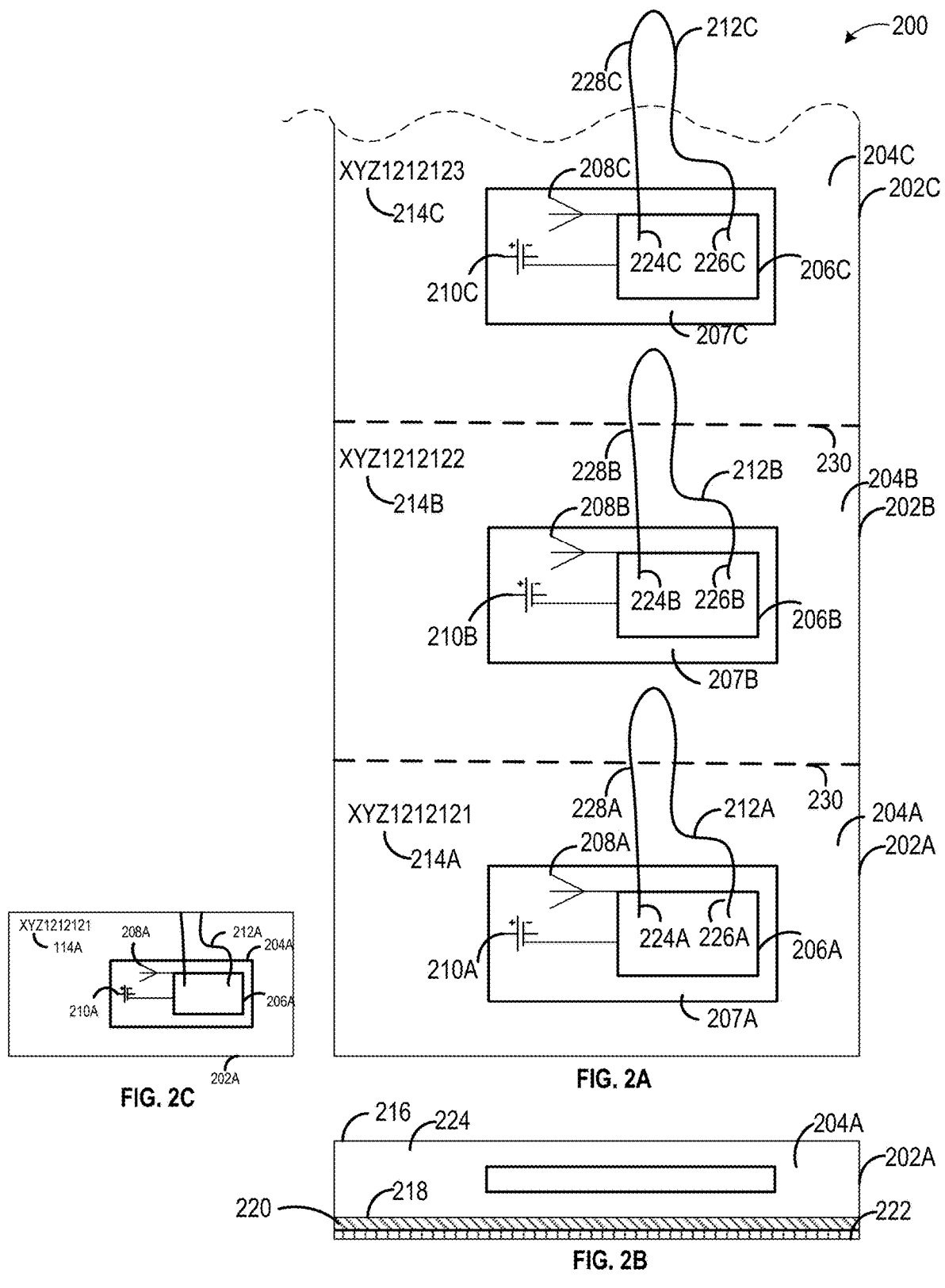
FIGS. 2A-C show views of example RFID tags.

FIGS. 2A-C show views of an example web of wireless tags 200 (e.g., RFID tags).

Referring to FIGS. 2A-C, the web of wireless tags 200 may comprise a plurality of wireless tags 202A-C. For example, the web of wireless tags 200 may be provided as a roll of wireless tags 102 and unrolled for processing in the system 100 of FIG. 1. While the example of FIG. 2A shows three wireless tags 202A-C, this is for example purposes only, as a roll of wireless tags 102 when unrolled for processing the web 200 may comprise hundreds or thousands of wireless tag. For example, the web of wireless tags 200 may be processed, activated, and/or programmed using the system 100.

Each wireless tag 202A-C may include a support base 204A-C. Each support base 204A-C for each wireless tag 202A-C may have a top surface 216 and an opposing bottom surface 218. Each wireless tag 202A-C may comprise an adhesive layer 220 provided along the bottom surface 218 of the respective support base 204A-C. Each wireless tag 202A-C may comprise a backing layer 222. The backing layer 222 may be provided along a bottom side of the adhesive layer 220. The backing layer 222 may be configured to be manually or automatically removable from the adhesive layer 220. Removing the backing layer 222 may expose the adhesive layer 220 and permit the adhesive layer 220 to couple the respective wireless tag 202A-C to another object, such as a package, a pallet, a container, a piece of equipment, a vehicle, or the like. For example, the support base 204A-C for each wireless tag 202A-C may be made of paper, plastic, a polymer, a combination thereof, or any other type of material.

Each wireless tag 202A-C may comprise an circuit 206A-C. For example, the circuit 204A-C may be disposed along the top surface 216 of the respective wireless tag 202A-C (e.g., the top surface of the support base 204A-C) or encapsulated within an interior volume 224 of the respective wireless tag 202A-C (e.g., an interior volume of the support base 204A-C). The wireless tag 204A-C may be an active RFID tag that has not been activated in its initial state on the roll of wireless tags 102. The wireless tag 202A-C may comprise a substrate 207A-C. For example, the substrate 207A-C may be made of a rigid or flexible material. For example, the substrate 207A-C may comprise one or more of plastic, poly-vinyl chloride, a polymer, polyethylenetherephtalate (PET) phenolics, polyesters, styrene, etc. For example, a bottom side of the substrate 207A-C may comprise an adhesive material or layer for coupling the circuit 206A-C and substrate 207A-C to the respective wireless tag 202A-C (e.g., the support base 204A-C).

For example, the circuit 206A-C may be disposed on the respective substrate 207A-C of the respective wireless tag 202A-C. For example, the circuit 206A-C may comprise an integrated circuit. For example, the circuit 206A-C may comprise an electronic circuit, microchip, or chip. For example, the circuit 206A-C may comprise a logic unit that is programmed to operate the respective wireless tag 202A-C. For example, the logic unit of the circuit 206A-C may be configured to receive additional programming or to have its program modified. For example, certain elements of the system 100 may be configured to program the logic unit or modify the programming of the logic unit of the circuit 206A-C. For example, the logic unit may further comprise memory to store data associated with the respective wireless tag 202A-C and/or for operating the respective wireless tag 202A-C. For example, the memory may comprise read-only memory (ROM) and/or random access memory (RAM). For example, the memory may comprises electrically erasable, programmable read-only memory (EEPROM). For example, data stored within the memory may include any one or more of a tag identifier (ID), label information, an object ID, password, or error detection code.

Each wireless tag 202A-C may comprise an antenna 208A-C. For example, the antenna 208A-C may be communicably coupled to the respective circuit 206A-C. For example, all or at least a portion of the antenna 208A-C may be disposed on or in the respective substrate 207A-C of the respective wireless tag 202A-C. For example, the antenna 208A-C may be disposed on the substrate 207A-C via etching, stamping, or screen printing. For example, the wireless tag 202A-C may comprise multiple antennas 208A-C. For example, the antenna 208A-C may facilitate communication between the circuit 206A-C and another device (e.g., an RFID reader (not shown)). For example, the antenna 208A-C may transmit data provided by the circuit 206A-C to the other device. For example, the antenna 208A-C may transmit the data and/or receive other data wirelessly via a radio transmission. For example, the antenna 208A-C may be configured to transmit and receive information at a particular frequency or within a predetermined frequency range. For example, the antenna 208A-C may have any form or shape. For example, the antenna 208A-C may be in the shape of a spiral coil, a single dipole, dual dipoles, a folded dipole or the like. For example, the antenna may be metal, such as copper, aluminum, silver, or any other type of metal.

Each wireless tag 202A-C may comprise a power source. For example the power source may comprise a battery 210A-C. The battery 210A-C may be disposed on and/or coupled to the respective substrate 207A-C or a portion of the support base 204A-C of the respective wireless tag 202A-C. The battery 210A-C may be configured to provide electrical power to the respective circuit 206A-C for operating the circuit 206A-C and for transmitting and receiving data via the respective antenna 208A-C. The battery 210A-C may be any known type of battery. For example, the battery 210A-C may be any one of a lithium-ion battery, a lithium-thionyl chloride battery, a nickel-cadmium battery, silver oxide battery, zinc-carbon battery, or an alkaline battery.

Each wireless tag 202A-C may comprise a power activation circuit 212A-C. The power activation circuit 212A-C may have a first end 224A-C, a second end 226A-C, and a circuit trace 228A-C that extends from the first end 224A-C to the second end 226A-C. For example, the first end 224A-C may be coupled or electrically coupled to a first portion of the respective circuit 206A-C and the second end 226A-C may be coupled or electrically coupled to a second portion of the respective circuit 206A-C. For example, the first portion and the second portion may be the same or a different part of the circuit 206A-C. The circuit trace 228A-C of the power activation circuit 212A-C may extend away from the circuit 206A-C. For example, the circuit trance 228A-C may extend along a first wireless tag 202A (e.g., along a first support base 204A) and to a second wireless tag 202B (e.g., to the second support base 204B) that is coupled or attached to the wireless tag 202A. For example, the web of wireless tags 104 may include a plurality of perforations 230 that extend between a first wireless tag (e.g., wireless tag 202A) and a second wireless tag (e.g., wireless tag 202B), such as between the first support base 204A and the second support base 204B, to provide an area for detaching the first wireless tag 202A from the second wireless tag 202B in the web. For example, the second wireless tag 202B may be positioned adjacent to the wireless tag 202A. For example, the circuit trace 228A-C may extend along a portion of the second wireless tag 202B (e.g., along a portion of the second support base 204B). For example, the power activation circuit 212A-C may be a closed circuit when the wireless tag 202A is attached to the second wireless tag 202B. In the closed circuit configuration, the power activation circuit 212A may prevent, or limit the amount of power, the circuit 206A can draw power from the battery 210A.

For example, once the wireless tag 202A has been prepared and is ready to be applied to a surface, the wireless tag 202A may be detached from the second wireless tag 202B. For example, a detached wireless tag 202A is shown in FIG. 2C. For example, the system 100 may automatically detach the wireless tag 202A from the remainder of the web of wireless tag or the wireless tag 202A may be detached manually by a user along the perforated line 230. For example, detaching the wireless tag 202A from the second wireless tag 202B may break and separate a portion of the circuit trace 228A extending along the second wireless tag 202B from other portions of the circuit trace 228A extending along the wireless tag 202A and cause the power activation circuit 212A to open. In the open configuration, the circuit 206A may draw power, or draw more power, from the battery 210A. For example, opening the power activation circuit 212A closes another circuit between the battery 210A and the circuit 206A. For example, opening the power activation circuit 212A may activate the circuit 206A and/or the wireless tag 202A, allowing the circuit 206A to draw power, or more power, from the battery 210A, and allow the circuit 206A to begin transmitting data via the antenna 208A.

For example, the circuit 206A-C may further comprise active electronics and/or software programming to close the circuit between the battery 210A and the circuit 206A when the power activation circuit 212A is opened. For example, the circuit 206A-C may be an integrated circuit designed with hardware to close the circuit between the battery 210A and the circuit 206A when the power activation circuit 212A-C is opened. For example, the circuit 206A-C may be programmed with an interrupt that is configured to fire when the power activation circuit 212A-C opens and allow the circuit to draw power, or draw more power, from the battery 210A. For example, the circuit 206A-C may transition from a no or low-power state, where the circuit 206A-C is unable to transmit the RFID signal, to a higher power state, where the circuit 206A-C is able to transmit the RFID signal, when the power activation circuit 212A-C is opened.

Figure 3A:
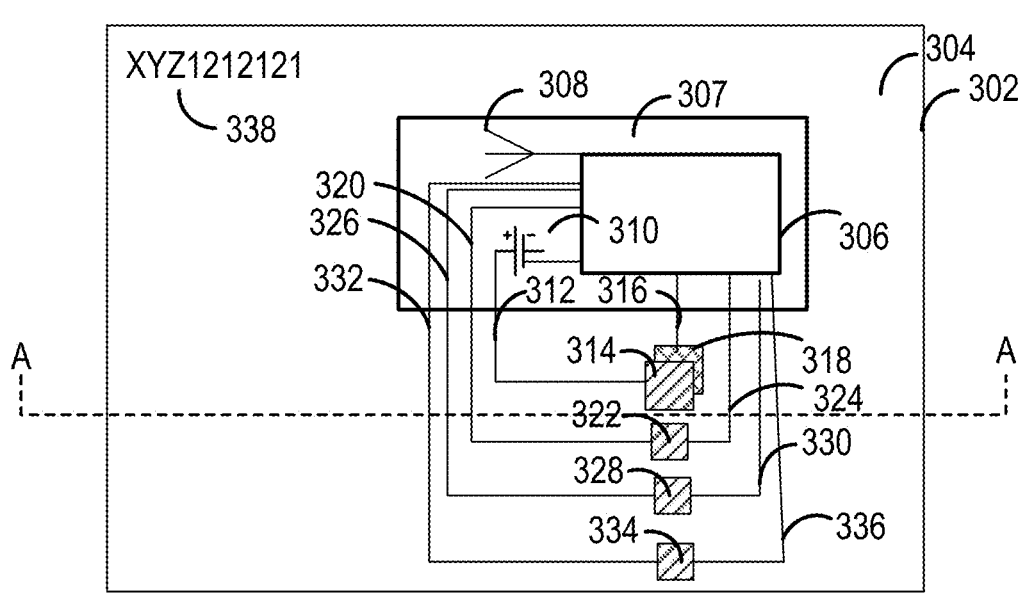
FIGS. 3A-B show views of an example RFID tag.
Figure 3B:
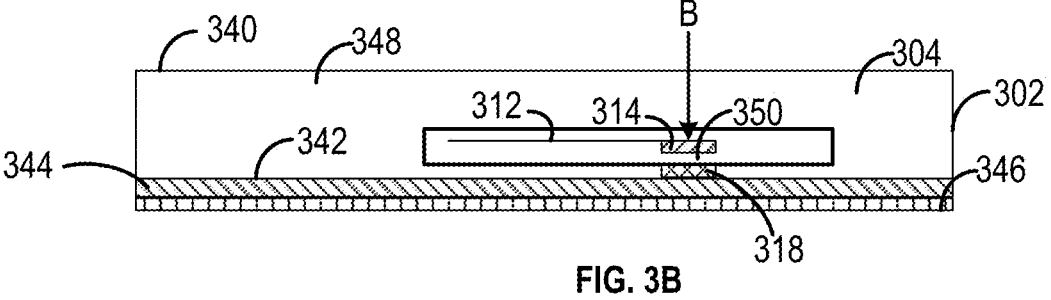

FIGS. 3A-B show views of an example wireless tag 300 (e.g., a wireless RFID tag). Referring to FIGS. 3A-B, the wireless tag 300 may be provided along with a plurality of other wireless tags as a roll of wireless tags 102 in substantially the same manner as shown in FIG. 2A and unrolled for processing in the system 100 of FIG. 1. For example, the wireless tag 300 may be processed, activated, and/or programmed using the system 100.

The wireless tag 302 may have a top surface 340 and an opposing bottom surface 342. The wireless tag 302 may comprise an adhesive layer 344 provided along the bottom surface 342 of the wireless tag 302. The wireless tag 302 may comprise a backing layer 346. The backing layer 346 may be provided along a bottom side of the adhesive layer 344. The backing layer 346 may be configured to be manually or automatically removable from the adhesive layer 344. Removing the backing layer 346 may expose the adhesive layer 344 and permit the adhesive layer 344 to couple the wireless tag 302 to another object, such as a package, a pallet, a container, a piece of equipment, a vehicle, or the like. For example, portions of the wireless tag 302 may be made of paper, plastic, a polymer, or any other type of material.

The wireless tag 302 may comprise a support base 304. For example, the support base 304 may be made of paper, plastic, a polymer, any combination thereof, or any other type of material. For example, the top surface 340 and the bottom surface 342 of the wireless tag 302 may be the top surface and the bottom surface of the support base 304.

For example, the wireless tag 302 may comprise a substrate 307. For example, the substrate 307 may be disposed along the top surface 340 of the wireless tag 302 (e.g., the top surface of the support base 304) or encapsulated within an interior volume 348 of the wireless tag 302 (e.g., an interior volume of the support base 304). The wireless tag 304 may be an active RFID tag that has not been activated in its initial state on the roll of wireless tags 102. For example, the substrate 307 may be made of a rigid or flexible material. For example, the substrate 307 may comprise one or more of plastic, poly-vinyl chloride, a polymer, polyethylenetherephtalate (PET) phenolics, polyesters, styrene, etc. For example, a bottom side of the substrate 307 may comprise an adhesive material or layer for coupling the substrate 307 to the wireless tag 302 (e.g., to the support base 304).

The wireless tag 302 may comprise a circuit 306. For example, the circuit 306 may be disposed on the substrate 307 of the wireless tag 302. For example, the circuit 306 may comprise an integrated circuit. For example, the circuit 306 may comprise an electronic circuit, microchip, or chip. For example, the circuit 306 may comprise a logic unit that is programmed to operate the wireless tag 302. For example, the logic unit of the circuit 306 may be configured to receive additional programming or to have its program modified. For example, certain elements of the system 100 may be configured to program the logic unit or modify the programming of the logic unit of the circuit 306. For example, the logic unit may further comprise memory to store data associated with the wireless tag 302 and/or for operating the wireless tag 302. For example, the memory may comprise read-only memory (ROM) and/or random access memory (RAM). For example, the memory may comprises electrically erasable, programmable read-only memory (EE-PROM). For example, data stored within the memory may include any one or more of a tag identifier (ID), label information, an object ID, password, or error detection code.

The wireless tag 302 may comprise an antenna 308. For example, the antenna 308 may be communicably coupled to the circuit 306. For example, all or at least a portion of the antenna 308 may be disposed on or in the substrate 307 of the wireless tag 302. For example, the antenna 308 may be disposed on the substrate 307 via etching, stamping, or screen printing. For example, the wireless tag 302 may comprise multiple antennas 308. For example, the antenna 308 may facilitate communication between the circuit 306 and another device (e.g., a wireless signal reader, such as an RFID reader (not shown)). For example, the antenna 308 may transmit data provided by the circuit 306 to the other device. For example, the antenna 308 may transmit the data and/or receive other data wirelessly via a radio transmission. For example, the antenna 308 may be configured to transmit and receive information at a particular frequency or within a predetermined frequency range. For example, the antenna 308 may have any form or shape. For example, the antenna 308 may be in the shape of a spiral coil, a single dipole, dual dipoles, a folded dipole or the like. For example, the antenna may be metal, such as copper, aluminum, silver, or any other type of metal.

The wireless tag 302 may comprise a power source. For example the power source may comprise a battery 310. The battery 310 may be disposed on and/or coupled to the substrate 307 or disposed on the support base 304 of the wireless tag 302. The battery 310 may be configured to provide electrical power to the circuit 306 for operating the circuit 306 and for transmitting and receiving data via the antenna 308. The battery 310 may be any type of battery now known or created in the future. For example, the battery 310 may be any one of a lithium-ion battery, a lithium-thionyl chloride battery, a nickel-cadmium battery, silver oxide battery, zinc-carbon battery, or an alkaline battery.

For example, the wireless tag 302 may comprise a power activation circuit. For example, the power activation circuit may comprise a first contact 314 electrically coupled to the circuit 306 and a second contact 318 electrically coupled to the circuit 306. For example, each of the first contact 314 and the second contact 318 may be made of conductive material. For example, the first contact 314 may be positioned vertically above the second contact 318. For example, each of the first contact 314 and the second contact 316 may be disposed along a portion of the wireless tag 302 (e.g., a portion of the support base 304) distal from the circuit 306. For example, the first contact 314 may be electrically coupled to the circuit 306 via a first electrical trace 312 and the second contact 318 may be electrically coupled to the circuit 306 via a second electrical trace 316. For example, the power activation circuit may initially be in an open circuit configuration whereby the first contact 314 and the second contact 316 are not touching or abutting one another. For example, in the open circuit configuration the power activation circuit may have an air gap 350 between the first contact 314 and the second contact 318. In the open circuit configuration, the power activation circuit may prevent or limit the circuit 306 from drawing power from, or otherwise the circuit 306 may not be able to draw power from, the battery 310. As discussed above, a battery tamper 112 of the system 100 may be configured to apply a force onto a portion of the RFID label 104 where the first contact 314 is located. The force may comprise a force in the downward direction. The force may cause the first contact 314 to move downward in the direction B and into contact with the second contact 318, thereby causing the power activation circuit to be in a closed circuit configuration. The first contact 314 or material around the first contact may be made of a non-resilient material such that once the first contact 314 is moved downward in the direction B and into contact with the second contact 318, the first contact 314 will not move back upward in the direction opposite B, but will remain in contact with the second contact 318. In the closed circuit configuration, the circuit 306 may draw power, or draw more power, from the battery 310. For example, closing the power activation circuit may activate the circuit 306, allow the circuit 306 to draw power, or draw more power, from the battery 310, and allow the circuit 306 to begin transmitting data via the antenna 308. For example, each of the first contact 314 and the second contact 318 may comprises a contact pad or surface for contacting the other respective contact. For example, the wireless tag 302 may alternatively include the power activation circuit 212A as described in FIGS. 2A-C above.

The wireless tag 302 may comprise one or a plurality of programming contacts 322, 328, 334. The programming contacts 322, 328, 334 may operate as a binary programming system whereby if the contacts 322, 328, 334 are open, the contacts 322, 328, 334 provide a first programing value (e.g., 0 or 1) and if the contacts 322, 328, 334 are closed, they provided a second programming value (e.g., the other of 0 or 1). Each programming contact 322, 328, 334 may be electrically and communicably coupled to the circuit 306. For example, each programming contact 322, 328, 334 may be electrically and communicably coupled to the circuit 306 via one or more electrical traces 320, 324, 328, 330, 332, 336. For example, each programming contact 322, 328, 334 may be disposed along a portion of the wireless tag 302 (e.g., a portion of the support base 304) distal from the circuit 306. Each programming contact 322, 328, 334 may be made of a compactable or deformable material that when compressed or deformed causes the respective programming contact 322, 328, 334 to close and changes the programming value of the respective programming contact 322, 328, 334 from the first programming value to the second programming value. The programming contacts 322, 328, 334 may provide information about the wireless tag 302, such as the label information 338 (e.g., an identifier, such as a support base ID or label ID). The programming contacts 322, 328, 334 may also provide operating instructions for the circuit 306. The operating instructions can be any one or more of how often or period for transmitting data, period for receiving and recording values of a sensor in communication with the circuit 306, instructions as to which sensors to operate and/or not operate, timing or period when the wireless tag 302 should be in a sleep or low-power mode, etc. For example, the system 100 of FIG. 1 may comprise one or more contact tampers 118 to apply a force onto a portion of the wireless tag 302 where one or more of the programming contacts 322, 328, 334 is located. The force may comprise a force in the downward direction B. The force may cause one or more of the programming contacts 322, 328, 334 to be compressed or deformed, thereby causing the respective programming contact 322, 328, 334 to close and change the programming value of the respective programming contact 322, 328, 334 from the first programming value to the second programming value. In another example, the design of each programming contact may be substantially the same as the contacts 314, 318 of the power activation circuit described above, with the separate contact pads vertically separated from one another, and one of the contact pads being pressed downward in the direct B into engagement or contact with the other contact pad.

The wireless tag 302 may comprise label information 338. For example, the label information 338 may be printed on a surface of the wireless tag 302 (e.g., on the surface of the support base 304) by the printer head 108 of FIG. 1. For example, the label information 338 may be printed on the top surface 340 of the wireless tag 302. The label information 338 may comprise the label ID. The label ID may be a unique identifier that is different from label IDs for other wireless tag. For example, the label information 338 may be an alphanumeric code, QR code, bar code, or any other 2-dimensional code.

Figure 4A:
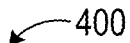
FIGS. 4A-C show views of an example RFID tag.
Figure 4A:
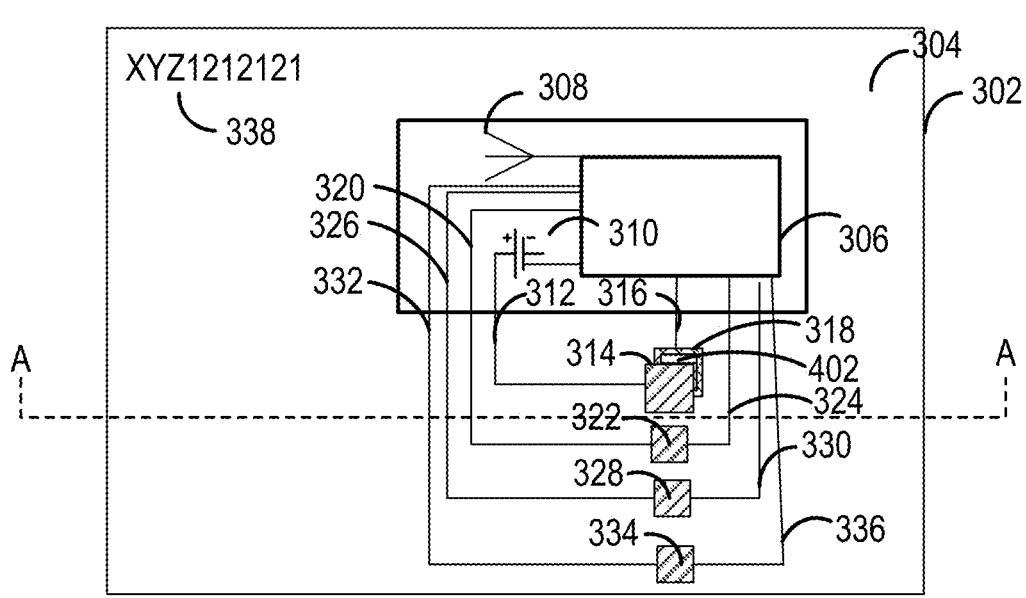
Figure 4B:
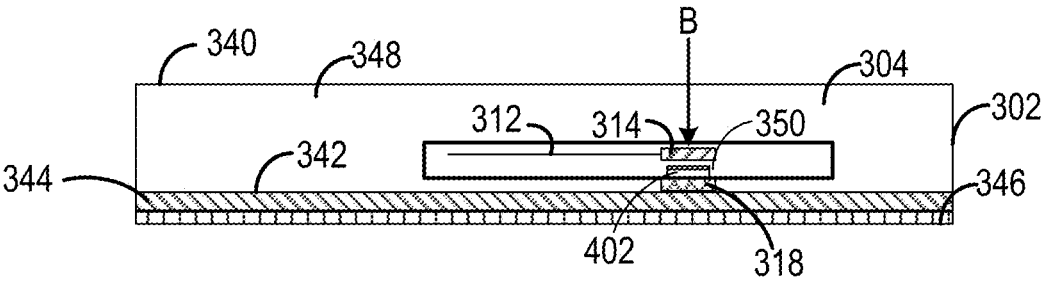
Figure 4C:
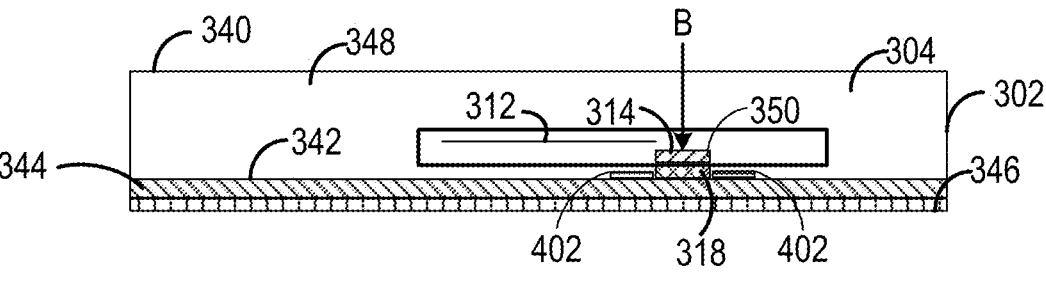

As shown in FIGS. 4A-C, the power activation circuit of the wireless tag 302 may comprise a nonconductive material 402 disposed on along the top surface of the bottom, second contact 318. For example, the nonconductive material 402 may comprise a nonconductive adhesive. For example, the nonconductive material 402 may prevent the first contact 314 from moving downward in the direction B and creating an electrical connection with the second contact 318.

For example, the nonconductive material 402 may have a relatively low melt point. For example, as the wireless tag 302 passes by the printer head 108 in the system 100 of FIG. 1, the heat created by the printer head 108 may cause the nonconductive material 402 to melt off of the second contact 318. For example, the nonconductive material 402 may melt off of the second contact and move to an area adjacent the second contact 318 on the wireless tag 302. The battery tamper 112 may subsequently apply a pressure to the first contact 314 in the downward direction B and into contact with the second contact 318, causing the power activation circuit to close. With the wireless tag 302 now away from the printer head 108, the nonconductive material 402 may begin to set, dry, or harden once again and may assist the surrounding areas of the wireless tag 302 to keep the first contact 314 electrically coupled to the second contact 318 and maintain the power activation circuit in a closed configuration.

Figure 5A:
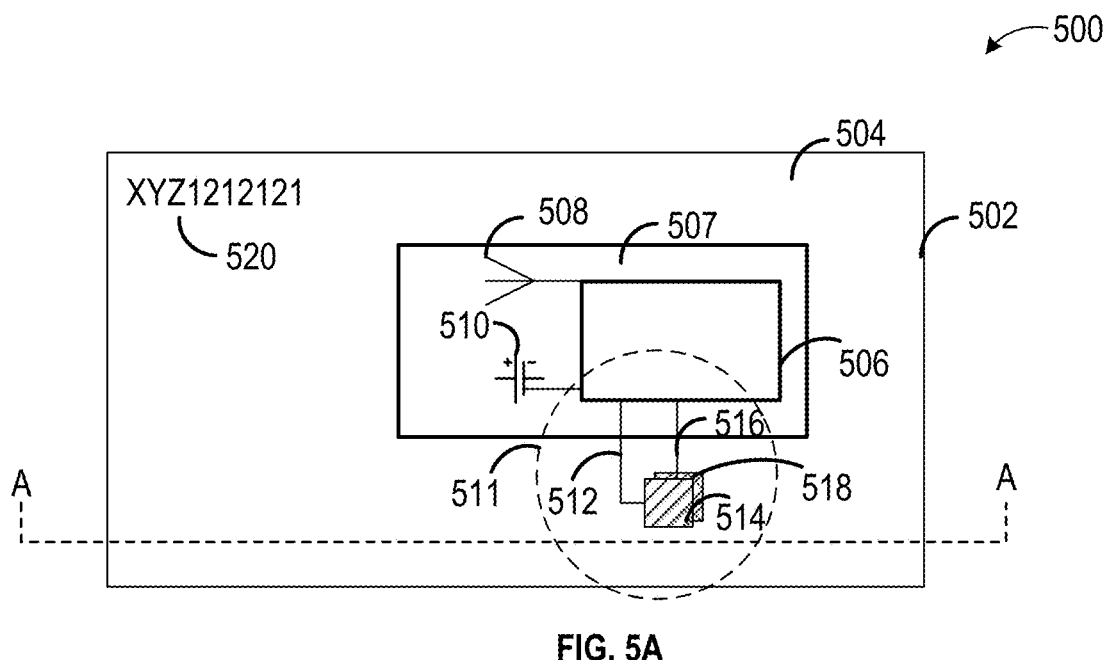
FIGS. 5A-B show views of an example RFID tag.
Figure 5B:
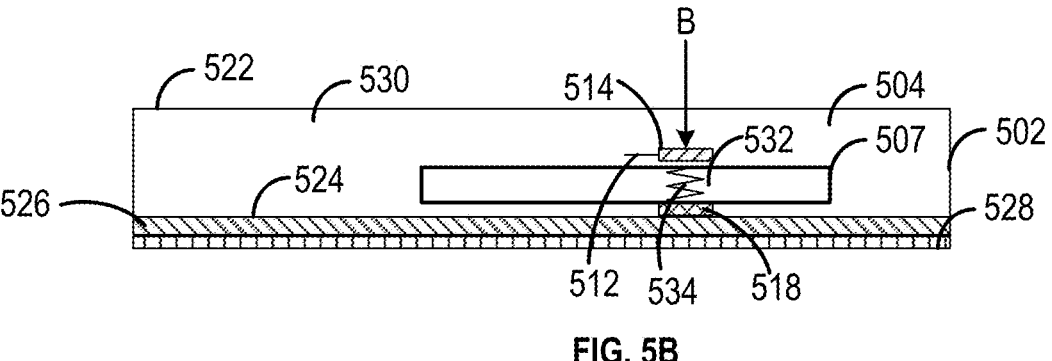

FIGS. 5A-B show views of an example wireless tag 500. Referring to FIGS. 5A-B, the wireless tag 500 may be provided along with a plurality of other wireless tags as a roll of wireless tags 102 in substantially the same manner as shown in FIG. 2A and unrolled for processing in the system 100 of FIG. 1. For example, the wireless tag 500 may be processed, activated, and/or programmed using the system 100.

The wireless tag 502 (e.g., a wireless RFID tag) may have a top surface 522 and an opposing bottom surface 524. The wireless tag 502 may comprise an adhesive layer 526 provided along the bottom surface 524 of the wireless tag 502. The wireless tag 502 may comprise a backing layer 528. The backing layer 528 may be provided along a bottom side of the adhesive layer 526. The backing layer 528 may be configured to be manually or automatically removable from the adhesive layer 526. Removing the backing layer 528 may expose the adhesive layer 526 and permit the adhesive layer 526 to couple the wireless tag 502 to another object, such as a package, a pallet, a container, a piece of equipment, a vehicle, or the like. For example, at least a portion of the wireless tag 502 may be made of paper, plastic, a polymer, any combination thereof, or any other type of material.

The wireless tag 502 may comprise a support base 504. For example, the support base 504 may be made of paper, plastic, a polymer, any combination thereof, or any other type of material. For example, the top surface 522 and the bottom surface 524 of the wireless tag 502 may be the top surface and the bottom surface of the support base 504.

For example, the wireless tag 502 may comprise a substrate 507. For example, the substrate 507 may be disposed along the top surface 522 of the wireless tag 502 (e.g., the top surface of the support base 504) or encapsulated within an interior volume 530 of the wireless tag 502 (e.g., an interior volume of the support base 504). For example, the substrate 507 may be made of a rigid or flexible material. For example, the substrate 507 may comprise one or more of plastic, poly-vinyl chloride, a polymer, polyethylenetherephtalate (PET) phenolics, polyesters, styrene, etc. For example, a bottom side of the substrate 507 may comprise an adhesive material or layer for coupling the substrate 507 to the wireless tag 502 (e.g., to the support base 504). The wireless tag 502 may be an active RFID tag that has not been activated in its initial state on the roll of wireless tags 102.

The wireless tag 502 may comprise a circuit 506. For example, the circuit 506 may be disposed on the substrate 507 of the wireless tag 502. For example, the circuit 506 may comprise an integrated circuit. For example, the circuit 506 may comprise an electronic circuit, microchip, or chip. For example, the circuit 506 may comprise a logic unit that is programmed to operate the wireless tag 502. For example, the logic unit of the circuit 506 may be configured to receive additional programming or to have its program modified. For example, certain elements of the system 100 may be configured to program the logic unit or modify the programming of the logic unit of the circuit 506. For example, the logic unit may further comprise memory to store data associated with the wireless tag 502 and/or for operating the wireless tag 502. For example, the memory may comprise read-only memory (ROM) and/or random access memory (RAM). For example, the memory may comprises electrically erasable, programmable read-only memory (EEPROM). For example, data stored within the memory may include any one or more of a tag identifier (ID), label information, an object ID, password, or error detection code.

The wireless tag 502 may comprise an antenna 508. For example, the antenna 508 may be communicably coupled to the circuit 506. For example, all or at least a portion of the antenna 508 may be disposed on or in the substrate 507 of the wireless tag 502. For example, the antenna 508 may be disposed on the substrate 507 via etching, stamping, or screen printing. For example, the wireless tag 502 may comprise multiple antennas 508. For example, the antenna 508 may facilitate communication between the circuit 506 and another device (e.g., a wireless signal reader, such as an RFID reader (not shown)). For example, the antenna 508 may transmit data provided by the circuit 506 to the other device. For example, the antenna 508 may transmit the data and/or receive other data wirelessly via a radio transmission. For example, the antenna 508 may be configured to transmit and receive information at a particular frequency or within a predetermined frequency range. For example, the antenna 508 may have any form or shape. For example, the antenna 508 may be in the shape of a spiral coil, a single dipole, dual dipoles, a folded dipole or the like. For example, the antenna may be metal, such as copper, aluminum, silver, or any other type of metal.

The wireless tag 502 may comprise a power source. For example the power source may comprise a battery 510. The battery 510 may be disposed on and/or coupled to the substrate 507 or disposed along the support base 504 of the wireless tag 502. The battery 510 may be configured to provide electrical power to the circuit 506 for operating the circuit 506 and for transmitting and receiving data via the antenna 508. The battery 510 may be any known type of battery or any battery developed in the future. For example, the battery 510 may be any one of a lithium-ion battery, a lithium-thionyl chloride battery, a nickel-cadmium battery, silver oxide battery, zinc-carbon battery, or an alkaline battery.

The wireless tag 502 may comprise label information 520. For example, the label information 520 may be printed on a surface of the wireless tag 502 (e.g., printed on a surface of the support base 504) by the printer head 108 of FIG. 1. For example, the label information 520 may be printed on the top surface 522 of the RFID label 502 (e.g., on the top surface of the support base 504). The label information 520 may comprise the label ID. The label ID may be a unique identifier that is different from label IDs for other wireless tags. For example, the label information 520 may be an alphanumeric code, QR code, bar code, or any other 2-dimensional code.

The wireless tag 502 may comprise one or more programming contacts 511. The programming contact 511 may operate as a binary programming system whereby if the contacts 514, 518 are open it provides a first programing value (e.g., 0) and if the contacts 514, 518 are closed, they provided a second programming value (e.g., 1). The programming contact 511 may be electrically and communicably coupled to the circuit 506. For example, the programming contact 511 may be electrically and communicably coupled to the circuit 506 via one or more electrical traces 512, 516. For example, the contacts 514, 518 for the programming contact 511 may be disposed along a portion of the wireless tag 502 (e.g., a portion of the support base 504) distal from the RFID tag 504. The programming contact 511 may comprise a first contact pad 514 and a second contact pad 518. The first 514 and second 518 contact pads may be separated by an air gap 532 to initially be in an open configuration. The programming contact 511 may comprise a spring 534 or other biasing or resilient material that maintains the first contact pad 514 separate from the second contact pad 518 and the programming contact 511 in the open configuration absent a force being applied. For example, a first end of the spring 534 may be coupled to the first contact pad 514 and the second end of the spring 534 may be coupled to the second contact pad 518. For example, the spring 534 may be a compression spring. For example, the spring 534 may be nonconductive. For example, a force may be applied to one of the contact pads (e.g., the first contact pad 514) to compress the spring 534 and allow the first contact pad 514 to contact and electrically couple with the second contact pad 518, thereby closing the programming contact 511 and changing the programming value for the programming contact from the first programming value to the second programming value. When the force is no longer applied, the spring 534 may cause the first contact pad 514 to separate from the second contact pad 518, opening the programming contact 511, and changing the programming value for the programming contact from the second programming value to the first programming value. The process of opening and closing the programming contact 511 via the application and removal of force may occur a plurality of times, allowing for a substantial amount of programming code to be provided to the circuit 506. The programming contact may provide information about the wireless tag 502, such as the label information 520 (e.g., label ID). The programming code provided via the programming contact 511 may also provide operating instructions for the circuit 506. The operating instructions can be any one or more of how often or period for transmitting data, period for receiving and recording values of a sensor in communication with the circuit 506, instructions as to which sensors to operate and/or not operate, timing or period when the wireless tag 502 should be in a sleep or low-power mode, etc. For example, a programming tamper 118 of the system 100 may be configured to apply a force and remove the force a plurality of times along a portion of the wireless tag 502 where the contact pads 514, 518 of the programming contact 511 are located. The force may comprise a force in the downward direction B. The force may be greater than the spring force of the spring 534, other biasing element, or other resilient material. The force may cause the first contact pad 514 to move downward towards and into contact with the second contact pad 518, thereby causing the programming contact 511 to close and change the programming value of the programming contact 511 from the first programming value to the second programming value. For example, the programming contact 511 of FIG. 5 may be included in the wireless tag 202A-C of FIGS. 2A-2C and may be used in place of programming contacts 322, 328, 334 in the RFID label 302 of FIGS. 3A-4C.

Figures 6A, 6B:
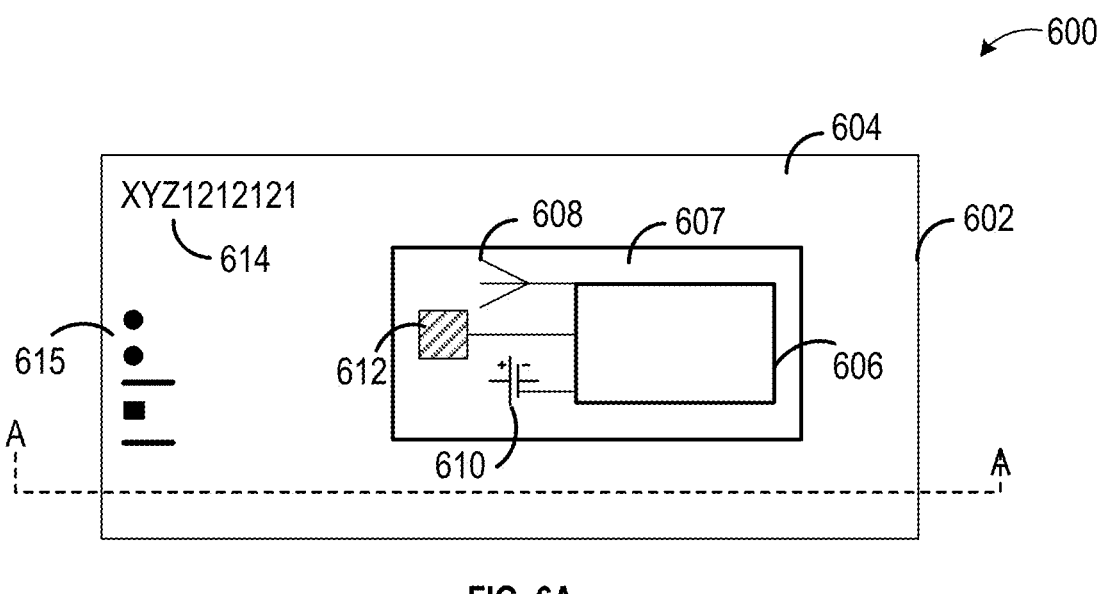
FIGS. 6A-B show views of an example RFID tag.

FIGS. 6A-B show views of an example wireless tag 600. Referring to FIGS. 6A-B, the wireless tag 600 may be provided along with a plurality of other wireless tag as a roll of wireless tag 102 in substantially the same manner as shown in FIG. 2A and unrolled for processing in the system 100 of FIG. 1. For example, the wireless tag 600 may be processed, activated, and/or programmed using the system 100.

The wireless tag 602 may have a top surface 616 and an opposing bottom surface 618. The RFID label 602 may comprise an adhesive layer 620 provided along the bottom surface 618 of the wireless tag 602. The wireless tag 602 may comprise a backing layer 622. The backing layer 622 may be provided along a bottom side of the adhesive layer 620. The backing layer 622 may be configured to be manually or automatically removable from the adhesive layer 620. Removing the backing layer 622 may expose the adhesive layer 620 and permit the adhesive layer 620 to couple the wireless tag 602 to another object, such as a package, a pallet, a container, a piece of equipment, a vehicle, or the like. For example, at least a portion of the wireless tag 602 may be made of paper, plastic, a polymer, any combination thereof, or any other type of material.

The wireless tag 602 may comprise a support base 604. For example, the support base 604 may be made of paper, plastic, a polymer, any combination thereof, or any other type of material. For example, the top surface 616 and the bottom surface 618 of the wireless tag 602 may be the top surface and the bottom surface of the support base 604.

The wireless tag 602 may comprise a substrate 607. For example, the substrate 607 may be disposed along the top surface 616 of the RFID label 602 (e.g., along the top surface of the support base 604) or encapsulated within an interior volume 624 of the wireless tag 602 (e.g., within an interior volume of the support base 604). For example, the substrate 607 may be made of a rigid or flexible material. For example, the substrate 607 may comprise one or more of plastic, poly-vinyl chloride, a polymer, polyethylenetherephtalate (PET) phenolics, polyesters, styrene, etc. For example, a bottom side of the substrate 607 may comprise an adhesive material or layer for coupling the substrate 607 to the wireless tag 602 (e.g., to the support base 604). The wireless tag 602 may be an active RFID tag that has or has not been activated in its initial state on the roll of wireless tags 102.

The wireless tag 602 may comprise a circuit 606. For example, the circuit 606 may be disposed on the substrate 607 of the wireless tag 602. For example, the circuit 606 may comprise an integrated circuit. For example, the circuit 606 may comprise an electronic circuit, microchip, or chip. For example, the circuit 606 may comprise a logic unit that is programmed to operate the wireless tag 602. For example, the logic unit of the circuit 606 may be configured to receive additional programming or to have its program modified. For example, the RFID programming system 122 of the system 100 may be configured to provide inputs to the circuit 606 to program the logic unit or modify the programming of the logic unit of the circuit 606. For example, the logic unit may further comprise memory to store data associated with the wireless tag 602 and/or for operating the wireless tag 602. For example, the memory may comprise read-only memory (ROM) and/or random access memory (RAM). For example, the memory may comprises electrically erasable, programmable read-only memory (EEPROM). For example, data stored within the memory may include any one or more of a tag identifier (ID), label information, an object ID, password, or error detection code.

The wireless tag 606 may comprise an antenna 608. For example, the antenna 608 may be communicably coupled to the circuit 606. For example, all or at least a portion of the antenna 608 may be disposed on or in the substrate 607 of the RFID tag 604. For example, the antenna 608 may be disposed on the substrate 607 via etching, stamping, or screen printing. For example, the RFID tag 604 may comprise multiple antennas 608. For example, the antenna 608 may facilitate communication between the circuit 606 and another device (e.g., a wireless signal reader, such as an RFID reader (not shown)). For example, the antenna 608 may transmit data provided by the circuit 606 to the other device. For example, the antenna 608 may transmit the data and/or receive other data wirelessly via a radio transmission. For example, the antenna 608 may be configured to transmit and receive information at a particular frequency or within a predetermined frequency range. For example, the antenna 608 may have any form or shape. For example, the antenna 608 may be in the shape of a spiral coil, a single dipole, dual dipoles, a folded dipole or the like. For example, the antenna may be metal, such as copper, aluminum, silver, or any other type of metal.

The wireless tag 602 may comprise a power source. For example the power source may comprise a battery 610. The battery 610 may be disposed on and/or coupled to the substrate 607 or the support base 604 of the wireless tag 604. The battery 610 may be configured to provide electrical power to the circuit 606 for operating the circuit 606 and for transmitting and receiving data via the antenna 608. The battery 610 may be any known or future-developed type of battery. For example, the battery 610 may be any one of a lithium-ion battery, a lithium-thionyl chloride battery, a nickel-cadmium battery, silver oxide battery, zinc-carbon battery, or an alkaline battery.

The wireless tag label 602 may comprise label information 614. For example, the label information 614 may be printed on a surface of the wireless tag 602 (e.g., on a surface of the support base 604) by the printer head 108 of FIG. 1. For example, the label information 614 may be printed on the top surface 616 of the wireless tag 602 (e.g., on the top surface of the support base 604). The label information 614 may comprise the label ID. The label ID may be a unique identifier that is different from label IDs for other RFID labels. For example, the label information 614 may be an alphanumeric code, QR code, bar code, or any other 2-dimensional code.

The wireless tag 602 may comprise a sensor 612. For example, the sensor 612 may be disposed on the substrate 607 of the RFID tag 604 or disposed along a portion of the support base 604 distal from the circuit 606. The sensor 612 may be electrically and communicably coupled to the circuit 606 of the wireless tag 602. The sensor 612 may be configured to sense an input from the RFID programming system 122 or another portion of the system 100. For example, the input may be one or more of a light input, a temperature input, a force input, or the like. For example, the sensor 612 may comprise one or more of a pressure sensitive resistor, a strain gauge, a pressure sensor, an optical sensor (e.g., a photodiode). For example, the sensor 612 may operate as a binary programming system for the circuit 606 of the wireless tag 602. For example, if the sensor 612 does not sense an input the sensor 612 provides a first programing value (e.g., 0 or 1) and if the sensor 612 senses and input, the sensor 612 provides a second programming value (e.g., the other of 0 or 1). The process of receiving and not receiving the input may occur a plurality of times, allowing for a substantial amount of programming code to be provided to the circuit 606 via the sensor 612. The sensor 612 may receive from the wireless tag programming system 122 and provide to the circuit 606 information about the wireless tag 602, such as the label information (e.g., label ID). The programming code provided by the RFID programming system 122 and received by the sensor 612 may also provide operating instructions for the circuit 606. The operating instructions may be any one or more of how often or period for transmitting data, period for receiving and recording values of a sensor (e.g., the sensor 612 or another sensor provided on the RFID label 602) in communication with the circuit, instructions as to which sensors (e.g., the sensor 612 and/or one or more other sensors provided on the wireless tag 602) to operate and/or not operate, timing or period when the wireless tag 602 should be in a sleep or low-power mode, etc. For example, the RFID programming system 122 of the system 100 may be configured to provide the input and not provide the input to the sensor 612 a plurality of times.

The wireless tag 602 may comprise indicia of a tag ID 615 associated with the circuit 606 for the wireless tag 602. For example, the indicia of the tag ID 615 may be provided along a top surface 616 of the wireless tag 602 (e.g., a top surface of the support base 604). For example, the indicia 615 may comprise dots, dashes, lines, a QR code, a bar code, alphanumeric characters or any other types of markings. The system 100 (e.g., the optical scanner 120A) may be configured to detect and determine the tag ID from the indicia 615 and associate it with the label information 614 in a database associated with the computing device 114.

The backing layer 622 of the wireless tag 602 may comprise one or more holes or openings 626 whereby a portion of the adhesive layer 620 is not covered by the backing layer 622. For example, the holes or openings 626 may be aligned along a longitudinal axis of the wireless tag 602. For example, the holes or openings 626 may be detected by the system 100 (e.g., the optical scanner 120B). For example, the size and/or spacing of the openings and the area between those openings 626 may operate as a binary information system for the computing device 114. For example, an opening 626 in the backing layer 622 may indicate a first binary value (e.g., 0 or 1) and no opening in the backing layer 622 may indicate a second binary value (e.g., the other of 0 or 1). For example, a small opening in the backing layer 622 may indicate a first binary value (e.g., 0 or 1) and a larger opening than the small opening in the backing layer may indicate a second binary value (e.g., the other of 0 or 1). For example, the optical scanner 120B may provide information about the one or more holes or openings 626 to the computing device 114. The computing device 114, based on the one or more holes or openings 626 may determine information associated with the wireless tag 602. For example, the information may comprise the tag ID associated with the circuit 606 and/or the label information (e.g., label ID) printed on the surface of the support base 604. The computing device 114 may then associate the tag ID and label ID and store that association in memory, such as a database.

Figure 7:
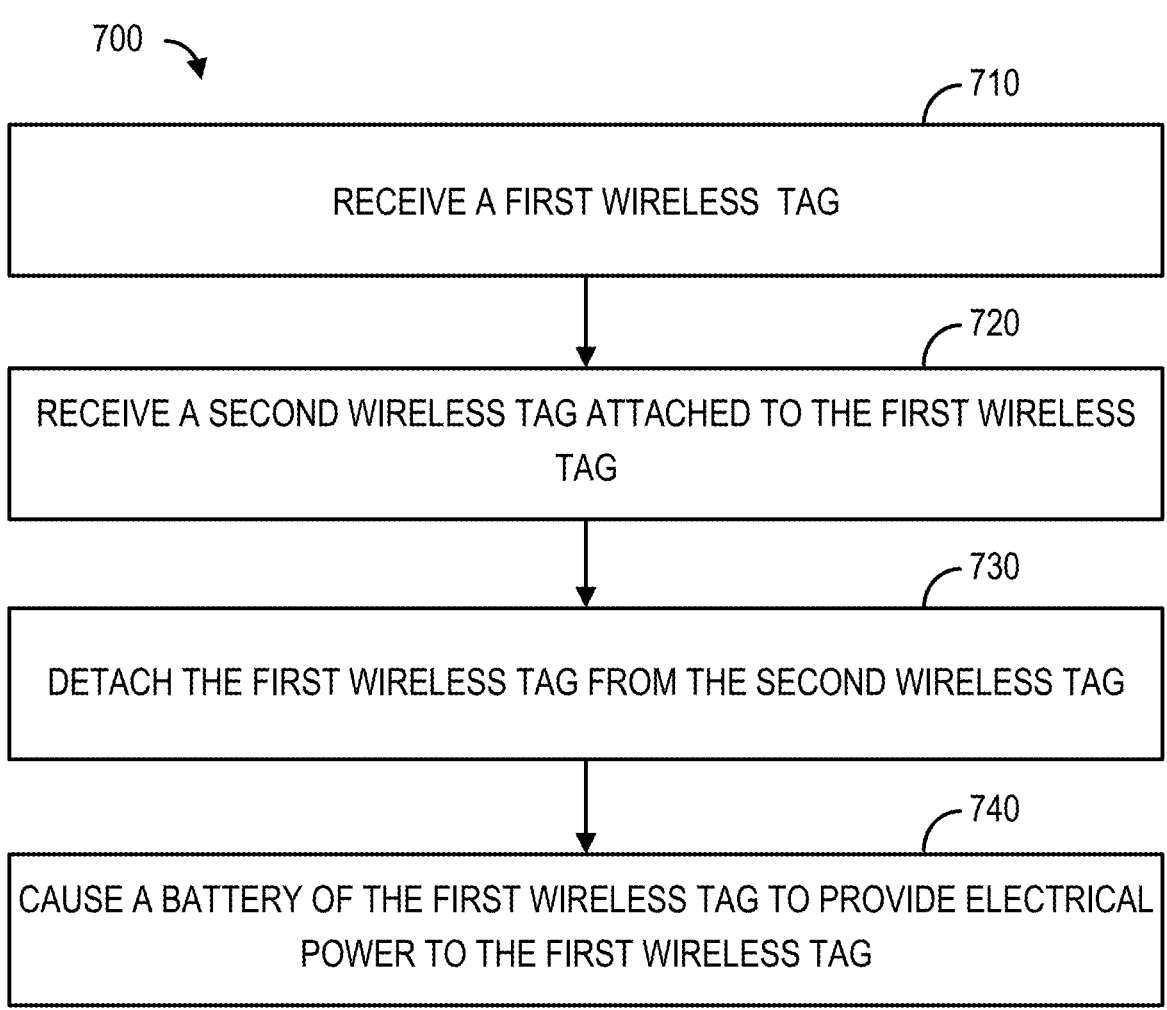
FIG. 7 shows a flowchart of an example method.

FIG. 7 shows an example method 700 for activating a wireless tag. The method 700 may be completed by the system 100 of FIG. 1. At 710, a first wireless tag may be received. For example, the first wireless tag may be an RFID tag and may be received from a roll of wireless tags 102. For example, the first wireless tag may be the wireless tag 202A of FIGS. 2A-C.

At 720, a second wireless tag may be received. For example, the second wireless tag may be an RFID tag and may be received from the roll of wireless tag 102 in the system 100. For example, the second wireless tag may be the wireless tag 202B of FIG. 2. For example, the first wireless tag 202A may be attached or coupled to and positioned adjacent to the second wireless tag 202B. The first wireless tag 202A may comprise a power activation circuit 212A. The power activation circuit 212A may have a first end 224A, a second end 226A, and a circuit trace 228A that extends from the first end 224A to the second end 226A. For example, the first end 224A may be coupled or electrically coupled to a first portion of a circuit 206A of the wireless tag 202A and the second end 226A may be coupled or electrically coupled to a second portion of the circuit 206A. For example, the first portion and the second portion may be the same or a different part of the circuit 206A. The circuit trace 228A of the power activation circuit 212A may extend away from the circuit 206A. For example, the circuit trace 228A may extend along the first wireless tag 202A and to the second wireless tag 202B that is coupled or attached to the first wireless tag 202A. For example, the circuit trace 228A may extend along a portion of the first support base 204A of the first wireless tag 202A and along a portion of the second support base 204B of the second wireless tag 202B. For example, a perforation 230 or tear line may extend between a first wireless tag 202A and the second wireless tag 202B to provide an area for detaching the first wireless tag 202A from the second wireless tag 202B. For example, the circuit trace 228A may extend along a portion of the surface of the second support base 204B of the second wireless tag 202B. For example, the power activation circuit 212A may be a closed circuit when the first wireless tag 202A is attached to the second wireless tag 202B and the circuit trace 228A extends from the first end 224A to the second end 224B without a break in the circuit trace 228A. In the closed circuit configuration, the power activation circuit 212A may prevent or limit the circuit 206A from drawing power from a battery 210A of the wireless tag 202A.

At 730, the first wireless tag 202A may be detached from the second wireless tag 202B. For example, the first wireless tag 202A may be detached from the second wireless tag 202B by the system 100. For example, the system 100 may comprise a blade or other cutting implement to detach the first wireless tag 202A from the second wireless tag 202B, such as along the perforation 230. For example, the first wireless tag 202A may be detached from the second wireless tag 202B manually by a user associated with the system 100.

For example, once the first wireless tag 202A has been prepared and is ready to be applied to a surface, the first wireless tag 202A may be detached from the second wireless tag 202B. For example, a detached first wireless tag 202A is shown in FIG. 2C. For example, detaching the first wireless tag 202A from the second wireless tag 202B may break and separate a portion of the circuit trace 228A extending along the second wireless tag 202B (e.g., extending along the second support base 204B) from other portions of the circuit trace 228A extending along the first wireless tag 202A (e.g., extending along the first support base 204A) and cause the power activation circuit 212A to open.

At 740, the battery 210A of the first wireless tag 202A may be caused to provide electrical power, or additional electrical power, to the circuit 206A of the first wireless tag 202A. For example, the battery 210A may provide power to the circuit 206A of the first wireless tag 202A. The battery 210A may be caused to provide electrical power, or additional electrical power, to the first wireless tag 202A based on the first wireless tag 202A being detached from the second wireless tag 202B. For example, the battery 210A may be caused to provide electrical power, or additional electrical power, to the first wireless tag 202A based on opening the power activation circuit 212A. For example, the battery 210A may be caused to provide electrical power, or additional electrical power, to the first wireless tag 202A based on breaking a portion of the trace 218A of the power activation circuit 212A by detaching the first wireless tag 202A from the second wireless tag 202B. For example, when the power activation circuit 212A is an open circuit or in the open configuration, the circuit 206A may draw power, or additional power, from the battery 210A. For example, opening the power activation circuit 212A may activate the circuit 206A and/or the wireless tag 202A, allow the circuit 206A to draw power, or additional power, from the battery 210A, and/or allow the circuit 206A to begin transmitting data via the antenna 208A.

Figure 8:
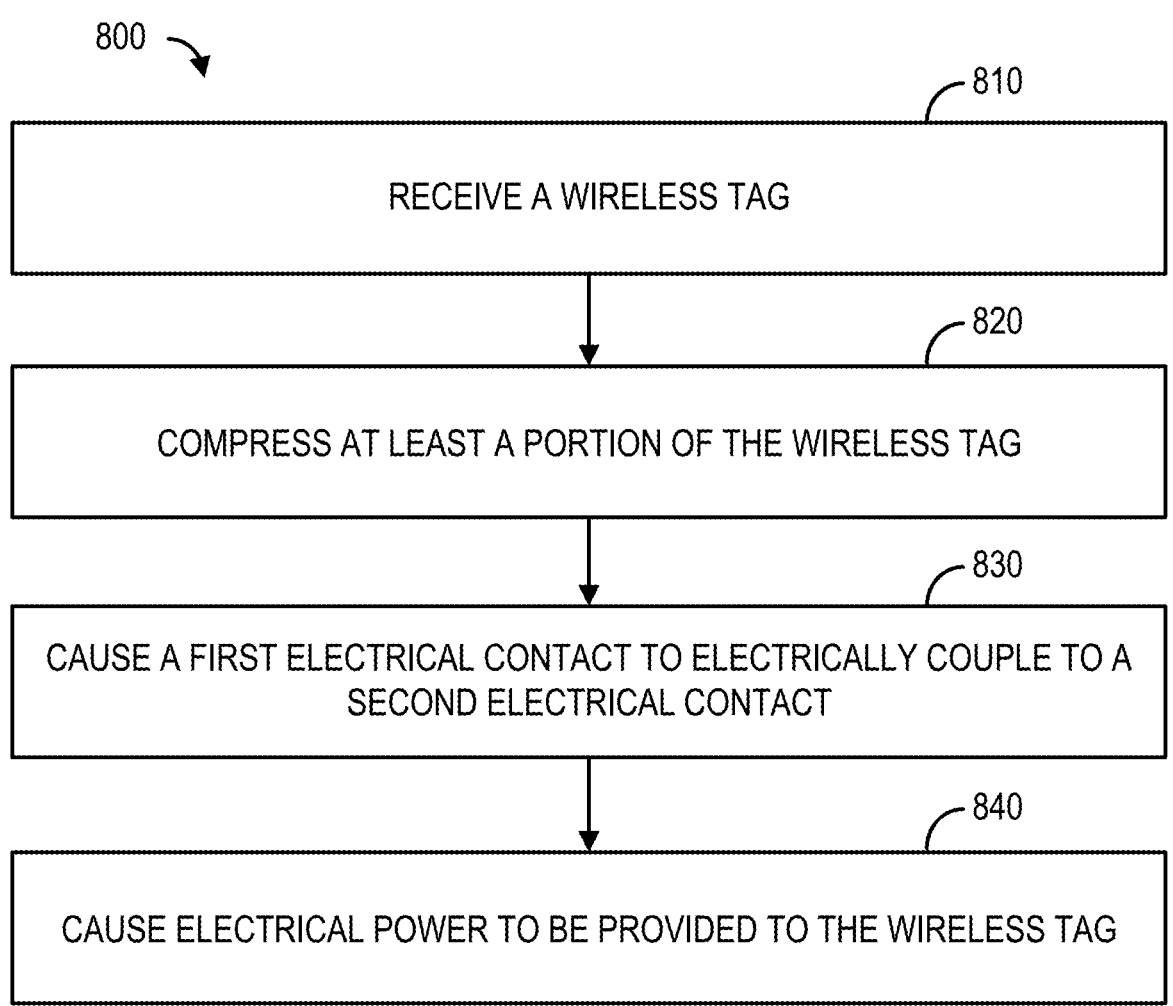
FIG. 8 shows a flowchart of an example method.

FIG. 8 shows an example method 800 for activating a wireless tag. The method 800 may be completed by the system 100 of FIG. 1. At 810, a wireless tag may be received. For example, the wireless tag may be and RFID tag and may be received from a roll of wireless tags 102. For example, the first wireless tag may be the wireless tag 302 of FIGS. 3A-C.

For example, the wireless tag 302 may comprise a power activation circuit. For example, the power activation circuit may comprise a first contact 314 electrically coupled to a circuit 306 of the wireless tag 302 and a second contact 318 electrically coupled to the circuit 306. For example, each of the first contact 314 and the second contact 318 may be made of conductive material. For example, the first contact 314 may be positioned vertically above the second contact 318 on the wireless tag 302. For example, each of the first contact 314 and the second contact 316 may be disposed along a portion of the wireless tag 302 (e.g., along the support base 304) distal from the circuit 306. For example, the first contact 314 may be electrically coupled to the circuit 306 via a first electrical trace 312 and the second contact 318 may be electrically coupled to the circuit 306 via a second electrical trace 316. The power activation circuit may initially be an open circuit or in an open circuit configuration whereby the first contact 314 and the second contact 316 are not touching or abutting one another. For example, in the open circuit configuration the power activation circuit may have an air gap 350 between the first contact 314 and the second contact 318. In the open circuit configuration, the power activation circuit may prevent, or limit, the circuit 306 from drawing power from, or otherwise the circuit 306 may not be able to draw power from, the battery 310.

At 820, at least a portion of the wireless tag may be compressed. For example, the portion of the wireless tag 302 compressed may comprise the first contact 314. For example, a battery tamper 112 may compress the portion of the wireless tag 302. For example, the battery tamper 112 of the system 100 may be configured to apply a force onto the portion of the wireless tag 104 where the first contact 314 is located. The force may comprise a force in the downward direction B and may cause the first contact 314 to move in the direction B.

At 830, the system may cause the first electrical contact 314 to electrically couple to the second electrical contact 318. For example, the first electrical contact 314 may be caused to electrically couple to the second electrical contact based on the force applied by the battery tamper 112 of the system 100. For example, the force may cause the first contact 314 to move downward in the direction B and into contact with the second contact 318, thereby electrically coupling the first contact 314 to the second contact 318 and causing the power activation circuit to close or be in a closed circuit configuration. The first contact 314 or material around the first contact 314 may be made of a non-resilient material such that once the first contact 314 is moved downward in the direction B and into contact with the second contact 318, the first contact 314 will not move back upward in the direction opposite B, but will remain in contact with the second contact 318.

At 840, the system 100 may cause electrical power to be provided, or additional electrical power to be provided, by a battery 310 of the wireless tag 302 to the wireless tag 302. For example, electrical power may be provided, or additional power provided, to the circuit 306 of the wireless tag 302. For example, the electrical power, or additional electrical power, may be caused to be provided by the battery 310 based on the power activation circuit closing (e.g., based on the first contact 314 contacting the second contact 318). When the power activation circuit is in the closed circuit configuration, the circuit 306 may draw power, or additional power, from the battery 310. For example, the battery tamper 112 of the system 100 closing the power activation circuit may activate the circuit 306, allow the circuit 306 to draw power, or additional power, from the battery 310, and/or allow the circuit 306 to begin transmitting data via the antenna 308. For example, each of the first contact 314 and the second contact 318 may comprises a contact pad or surface for contacting the other respective contact.

Figure 9:
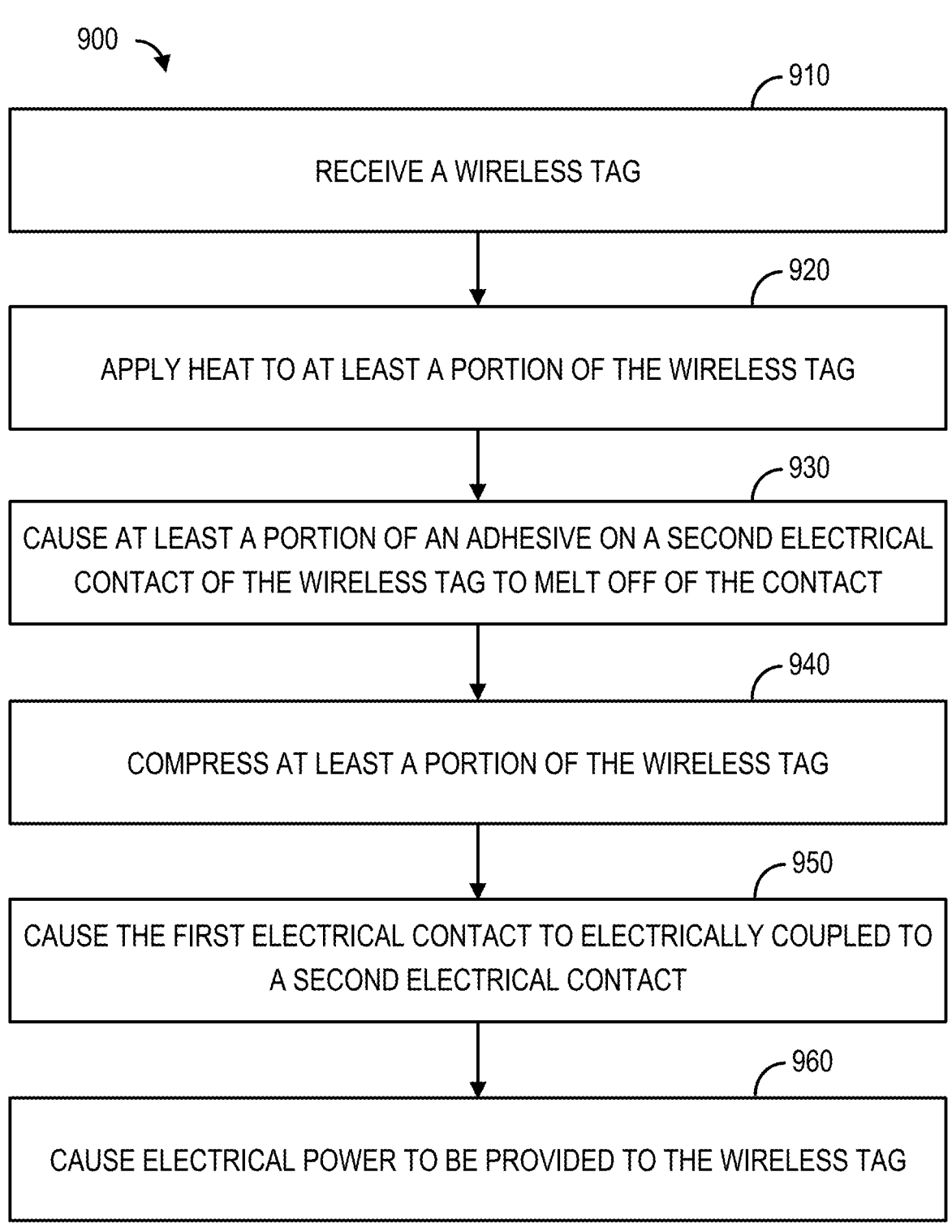
FIG. 9 shows a flowchart of an example method.

FIG. 9 shows an example method 900 for activating a wireless tag. The method 900 may be completed by the system 100 of FIG. 1. At 910, a wireless tag may be received. For example, the wireless tag may be received from a roll of wireless tags 102. The wireless tag may comprise an RFID tag. For example, the wireless tag may be the wireless tag 302 of FIGS. 4A-C.

For example, the wireless tag 302 may comprise a power activation circuit. For example, the power activation circuit may comprise a first contact 314 electrically coupled to a circuit 306 and a second contact 318 electrically coupled to the circuit 306. For example, each of the first contact 314 and the second contact 318 may be made of conductive material. For example, the first contact 314 may be positioned vertically above the second contact 318 on the wireless tag 302. For example, each of the first contact 314 and the second contact 316 may be disposed along a portion of the wireless tag 302 (e.g., along a portion of the support base 304) distal from the RFID tag 304. For example, the first contact 314 may be electrically coupled to the circuit 306 via a first electrical trace 312 and the second contact 318 may be electrically coupled to the circuit 306 via a second electrical trace 316. The power activation circuit may initially be an open circuit or in an open circuit configuration whereby the first contact 314 and the second contact 316 are not touching or abutting one another. For example, in the open circuit configuration the power activation circuit may have an air gap 350 between the first contact 314 and the second contact 318. In the open circuit configuration, the power activation circuit may prevent, or limit, the circuit 306 from drawing power from, or otherwise the circuit 306 may not be able to draw power from, the battery 310. The power activation circuit of the wireless tag 302 may comprise a nonconductive material 402 disposed on and/or along the top surface of the bottom, second contact 318. For example, the nonconductive material 402 may comprise a nonconductive adhesive. For example, the nonconductive material 402 may initially prevent the first contact 314 from moving downward in the direction B and creating an electrical connection with the second contact 318.

At 920, heat may be applied to at least a portion of the wireless tag 302. The portion of the wireless tag 302 may comprise the second contact 318. For example, the heat may be applied by a heat source. For example, the printer head 108 may comprise the heat source. For example, the heat may be applied to the portion of the wireless tag 302 as the printer head 108 is printing on a surface of the wireless tag 302 (e.g., along a surface of the support base 304).

At 930, at least a portion of the nonconductive material 402 may be caused to melt off of the second contact 318. For example, all or substantially all of the nonconductive material 402 may be caused to melt off of the top surface of the second contact 318. For example, the nonconductive material 402 may be caused to melt off of the second contact 318 based on the application of heat from the printer head 108 or another heat source. For example, the nonconductive material 402 may have a relatively low melt point. For example, as the wireless tag 302 passes by the printer head 108 in the system 100 of FIG. 1, the heat created by the printer head 108 may cause the nonconductive material 402 to partially or completely melt off of the top surface of the second contact 318. For example, the nonconductive material may 402 may melt off of the second contact and move to an area adjacent to the second contact on the wireless tag 302.

At 940, at least a portion of the wireless tag 302 may be compressed. For example, the portion of the wireless tag 302 compressed may comprise the first contact 314. For example, a battery tamper 112 may compress the portion of the wireless tag 302. For example, the battery tamper 112 of the system 100 may be configured to apply a force onto the portion of the wireless tag 104 where the first contact 314 is located. The force may comprise a force in the downward direction B.

At 950, the system may cause the first electrical contact 314 to electrically couple to the second electrical contact 318. For example, the first electrical contact 314 may be caused to electrically couple to the second electrical contact based on the force applied by the battery tamper 112 of the system 100. For example, the force may cause the first contact 314 to move downward in the direction B and into contact with the second contact 318, thereby electrically coupling the first contact 314 to the second contact 318 and causing the power activation circuit to close or be in a closed circuit configuration. The first contact 314 or material around the first contact 314 may be made of a non-resilient material such that once the first contact 314 is moved downward in the direction B and into contact with the second contact 318, the first contact 314 will not move back upward in the direction opposite B, but will remain in contact with the second contact 318. In addition or in the alternative, with the wireless tag 302 now away from the printer head 108, the nonconductive material 402 may begin to set, dry, or harden once again and may assist the surrounding areas of the wireless tag 302 to keep the first contact 314 electrically coupled to the second contact 318 and maintain the power activation circuit in a closed configuration.

At 960, the system 100 may cause electrical power, or additional electrical power, to be provided by a battery 310 of the wireless tag 304 to the circuit 306. For example, electrical power may be provided to the circuit 306 of the wireless tag 304. For example, the electrical power, or additional electrical power, may be caused to be provided by the battery 310 based on the power activation circuit closing (e.g., based on the first contact 314 contacting the second contact 318). When the power activation circuit is in the closed circuit configuration, the circuit 306 may draw power, or additional power, from the battery 310. For example, the battery tamper 112 of the system 100 closing the power activation circuit may activate the circuit 306, allow the circuit 306 to draw power, or additional power, from the battery 310, and/or allow the circuit 306 to begin transmitting data via the antenna 308. For example, each of the first contact 314 and the second contact 318 may comprises a contact pad or surface for contacting the other respective contact.

Figure 10:
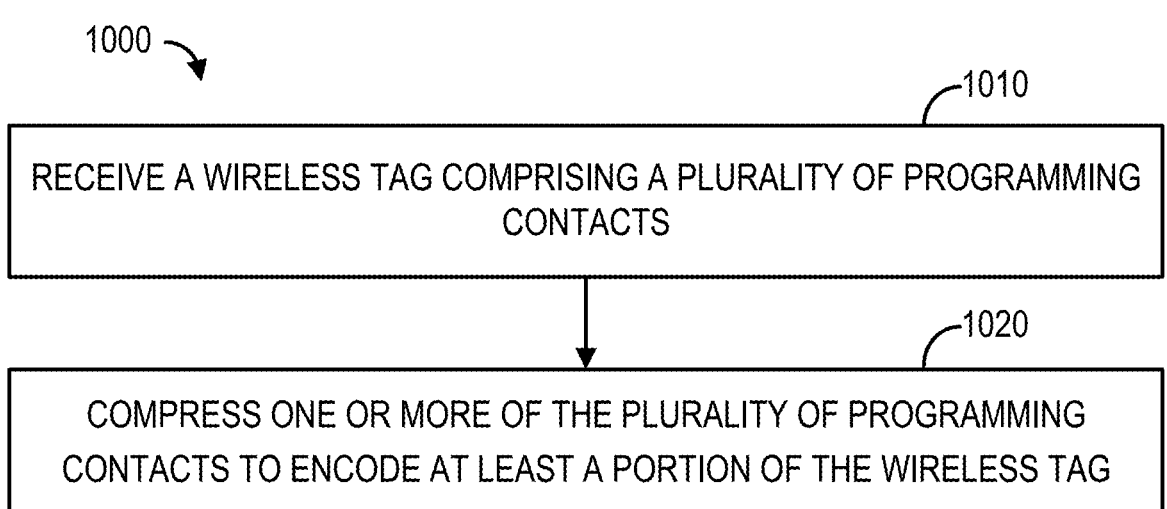
FIG. 10 shows a flowchart of an example method.

FIG. 10 shows an example method 1000 for programming, modifying a program, and/or supplementing a program or operating instructions for a circuit of a wireless tag. The method 1000 may be completed by the system 100 of FIG. 1. At 1010, a wireless tag may be received. For example, the wireless tag may be received from a roll of wireless tags 102. The wireless tag may comprise an RFID tag. For example, the wireless tag may be the wireless tag 302 of FIGS. 3A-C.

For example, the wireless tag 302 may comprise one or a plurality of programming contacts 322, 328, 334. The programming contacts 322, 328, 334 may operate as a binary programming system whereby if the contacts 322, 328, 334 are open, the contacts 322, 328, 334 provide a first programing value (e.g., 0 or 1) and if the contacts 322, 328, 334 are closed, they provided a second programming value (e.g., the other of 0 or 1). Each programming contact 322, 328, 334 may be electrically and communicably coupled to a circuit 306. For example, each programming contact 322, 328, 334 may be electrically and communicably coupled to the circuit 306 via one or more electrical traces 320, 324, 328, 330, 332, 336. For example, each programming contact 322, 328, 334 may be disposed along a portion of the wireless tag 104 (e.g., a portion of the support base 304) distal from the circuit 306. Each programming contact 322, 328, 334 may be made of a compactable material that when compressed or deformed causes the respective programming contact 322, 328, 334 to close and changes the programming value of the respective programming contact 322, 328, 334 from the first programming value to the second programming value.

The programming contacts 322, 328, 334 may provide information about the wireless tag 302, such as the label information 338 (e.g., label ID). The programming contacts 322, 328, 334 may also provide operating instructions for the circuit 306. The operating instructions can be any one or more of how often or period for transmitting data, period for receiving and recording values of a sensor in communication with the circuit 306, instructions as to which sensors to operate and/or not operate, timing or period when the wireless tag 304 should be in a sleep or low-power mode, etc.

At 1020, one or more of the one or the plurality of programming contacts may be contacted and/or compressed to encode at least a portion of the circuit 306. For example, the system 100 of FIG. 1 may comprise one or more contact tampers 118 to apply a force onto a portion of the wireless tag 302 where one or more of the programming contacts 322, 328, 334 is located to compress or contact the particular programming contact 322, 328, 334. The force may comprise a force in the downward direction B. The force may cause one or more of the programming contacts 322, 328, 334 to be compressed or deformed, thereby causing the respective programming contact 322, 328, 334 to close and change the programming value of the respective programming contact 322, 328, 334 from the first programming value to the second programming value. In another example, the design of each programming contact may be substantially the same as the contacts 314, 318 of the power activation circuit described above, with the separate contact pads vertically separated from one another, and one of the contact pads being pressed downward in the direct B into engagement or contact with the other contact pad. For example, only a portion of the programming contacts 322, 328, 334 may be compressed or contacted to change the programming value from the first programming value to the second programming value. While FIG. 3 shows three programming contacts, this is for example purposes only as greater or fewer numbers of programming contacts may be provided on the wireless tag 302 for programming the RFID tag 304.

Figure 11:
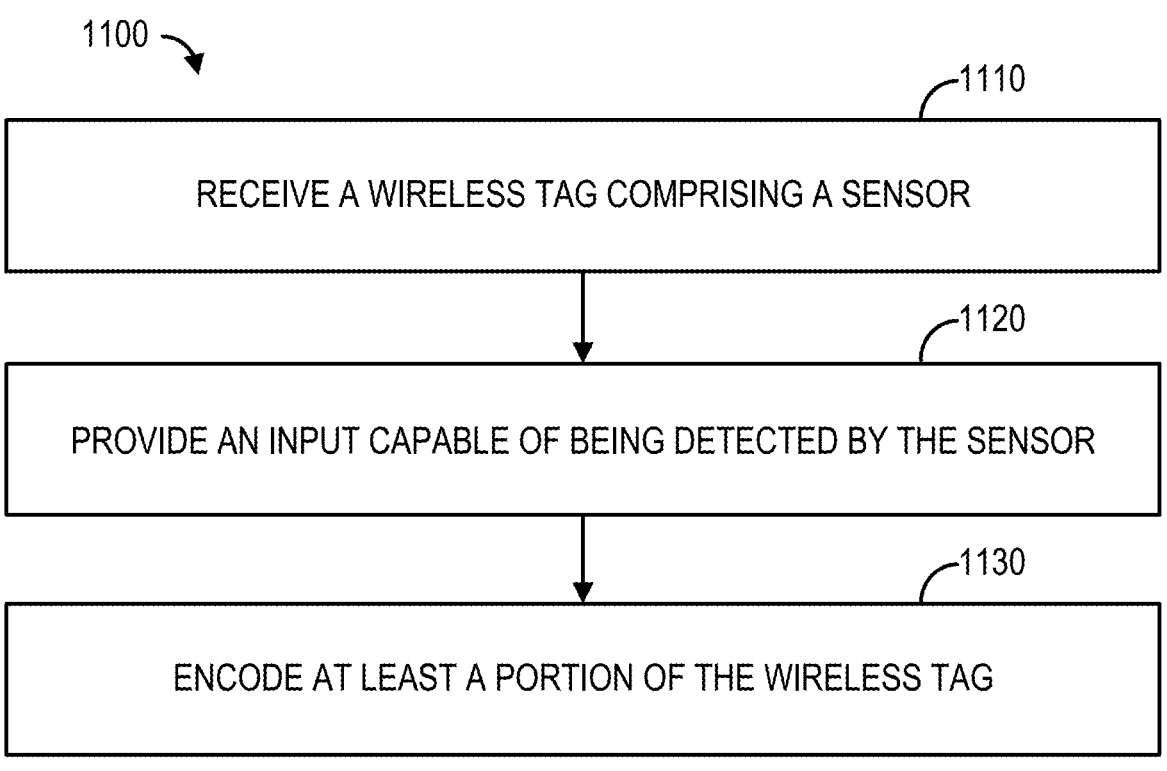
FIG. 11 shows a flowchart of an example method.

FIG. 11 shows an example method 1100 for programming, modifying a program, and/or supplementing a program or operating instructions for a circuit of a wireless tag. The method 1100 may be completed by the system 100 of FIG. 1. At 1110, a wireless tag may be received. For example, the wireless tag may be received from a roll of wireless tags 102. The wireless tag may comprise a sensor. For example, the wireless tag may be an RFID tag. For example, the wireless tag may be the wireless tag 602 of FIGS. 6A-B. The wireless tag 602 may comprise a sensor 612. For example, the sensor 612 may be disposed on a substrate 607 of the wireless tag 602 or disposed along a portion of the wireless tag 602 (e.g., along a portion of the support base 604) distal from the circuit 606. The sensor 612 may be electrically and communicably coupled to a circuit 606 of the RFID tag 604.

At 1120, an input may be produced or provided that can be detected by the sensor 612. For example, the input may be produced and output by the wireless tag programming system 122 or another portion of the system 100. The sensor 612 may be configured to sense an input from the wireless tag programming system 122 or another portion of the system 100. For example, the input may be one or more of a light input, a temperature input, a force input, or the like. For example, the sensor 612 may comprise one or more of a pressure sensitive resistor, a strain gauge, a pressure sensor, an optical sensor (e.g., a photodiode).

At 1130, at least a portion of the wireless tag 602 may be encoded. For example, the portion of the wireless tag 602 may comprise the circuit 606. For example, encoding the wireless tag 602 may comprise programming, modifying the program, and/or supplementing the program of the circuit 606 for the wireless tag 602. For example, the sensor 612 may operate as a binary programming system for the circuit 606 of the wireless tag 602. For example, if the sensor 612 does not sense an input from the wireless tag programming system 122 or another portion of the system 100 as the wireless tag 602 is passing by (e.g., as part of the web of wireless tags 102) the wireless tag programming system 122, the sensor 612 provides a first programing value (e.g., 0 or 1) and if the sensor 612 senses and input, the sensor 612 provides a second programming value (e.g., the other of 0 or 1). The process of receiving and not receiving the input may occur a plurality of times as the wireless tag 602 passes by the wireless tag programming system 122, allowing for a substantial amount of programming code to be provided to the circuit 606 via the sensor 612. For example, the web of wireless tags 102 may stop or pause as the wireless tag programming system 122 provides the input. The sensor 612 may receive from the wireless tag programming system 122 and provide to the circuit 606 information about the wireless tag 602, such as the label information (e.g., label ID). The programming code provided by the wireless tag programming system 122 and received by the sensor 612 may also provide operating instructions for the circuit 606. The operating instructions may be any one or more of how often or period for transmitting data, period for receiving and recording values of a sensor (e.g., the sensor 612 or another sensor provided on the wireless tag 602) in communication with the circuit, instructions as to which sensors (e.g., the sensor 612 and/or one or more other sensors provided on the wireless tag 602) to operate and/or not operate, timing or period when the wireless tag 602 should be in a sleep or low-power mode, etc. For example, the wireless tag programming system 122 of the system 100 may be configured to provide the input and not provide the input to the sensor 612 a plurality of times.

Figure 12:
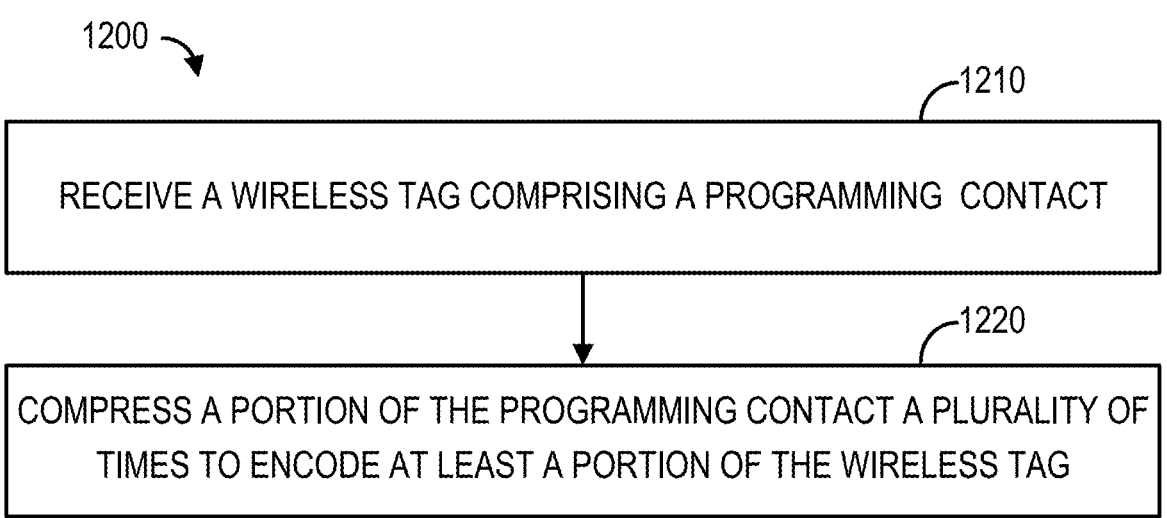
FIG. 12 shows a flowchart of an example method.

FIG. 12 shows an example method 1200 for programming, modifying a program, and/or supplementing a program or operating instructions for a circuit of a wireless tag. The method 1200 may be completed by the system 100 of FIG. 1. At 1210, a wireless tag may be received. For example, the wireless tag may be received from a roll of wireless tags 102. The wireless tag may comprise an RFID tag. The wireless tag may comprise a programming contact. For example, the wireless tag may be the wireless tag 502 of FIGS. 5A-B.

The wireless tag 502 may comprise one or more programming contacts 511. The programming contact 511 may operate as a binary programming system whereby if the contacts 514, 518 are open, they provide a first programing value (e.g., 0 or 1) and if the contacts 514, 518 are closed, they provide a second programming value (e.g., the other of 0 or 1). The programming contact 511 may be electrically and communicably coupled to a circuit 506 of the wireless tag 502. For example, the programming contact 511 may be electrically and communicably coupled to the circuit 506 via one or more electrical traces 512, 516. For example, the contacts 514, 518 for the programming contact 511 may be disposed along a portion of the wireless tag 502 (e.g., a portion of the support base 504) distal from the circuit 506. The programming contact 511 may comprise a first contact pad 514 and a second contact pad 518. The first 514 and second 518 contact pads may be separated by an air gap 532 to initially be in an open configuration.

The programming contact 511 may comprise a spring 534 or other biasing or resilient material that maintains the first contact pad 514 separate from the second contact pad 518 and the programming contact 511 in the open configuration absent a force being applied. For example, a first end of the spring 534 may be coupled to the first contact pad 514 and the second end of the spring 534 may be coupled to the second contact pad 518. For example, the spring 534 may be a compression spring. For example, the spring 534 may be nonconductive.

At 1220, a portion of the programming contact 511 may be compressed or contacted a plurality of times. For example, the portion of the programming contact may comprise the first contact pad 514. For example, compressing or contacting the portion of the programming contact a plurality of times may encode at least a portion of the wireless tag 502. For example, the portion of the wireless tag 502 encoded may comprise the circuit 506. For example, encoding the circuit 506 may comprise programming, modifying the program, or supplementing the program or operations of the circuit 506 and/or wireless tag 502.

For example, a force may be applied to one of the contact pads (e.g., the first contact pad 514) to compress the spring 534 and allow the first contact pad 514 to contact and electrically couple with the second contact pad 518, thereby closing the programming contact 511 and changing the programming value for the programming contact from the first programming value to the second programming value. When the force is no longer applied, the spring 534 may cause the first contact pad 514 to separate from the second contact pad 518, opening the programming contact 511, and changing the programming value for the programming contact from the second programming value to the first programming value. The process of opening and closing the programming contact 511 via the application and removal of force by the system 100 (e.g., a programming tamper 118) may occur a plurality of times, allowing for a substantial amount of programming code to be provided to the circuit 506.

The programming contact 511 may provide information about the wireless tag 502, such as the label information 520 (e.g., label ID). The programming code provided via the programming contact 511 may also provide operating instructions for the circuit 506. The operating instructions can be any one or more of how often or period for transmitting data, period for receiving and recording values of a sensor in communication with the circuit 506, instructions as to which sensors to operate and/or not operate, timing or period when the wireless tag 502 should be in a sleep or low-power mode, etc.

For example, a programming tamper 118 of the system 100 may be configured to apply a force and remove the force a plurality of times along a portion of the wireless tag 502 where the contact pads 514, 518 of the programming contact 511 are located. The force may comprise a force in the downward direction B. The force may be greater than the spring force of the spring 534, other biasing element, or other resilient material. The force may cause the first contact pad 514 to move downward in the direction B towards and into contact with the second contact pad 518, thereby causing the programming contact 511 to close and change the programming value of the programming contact 511 from the first programming value to the second programming value.

Figure 13:
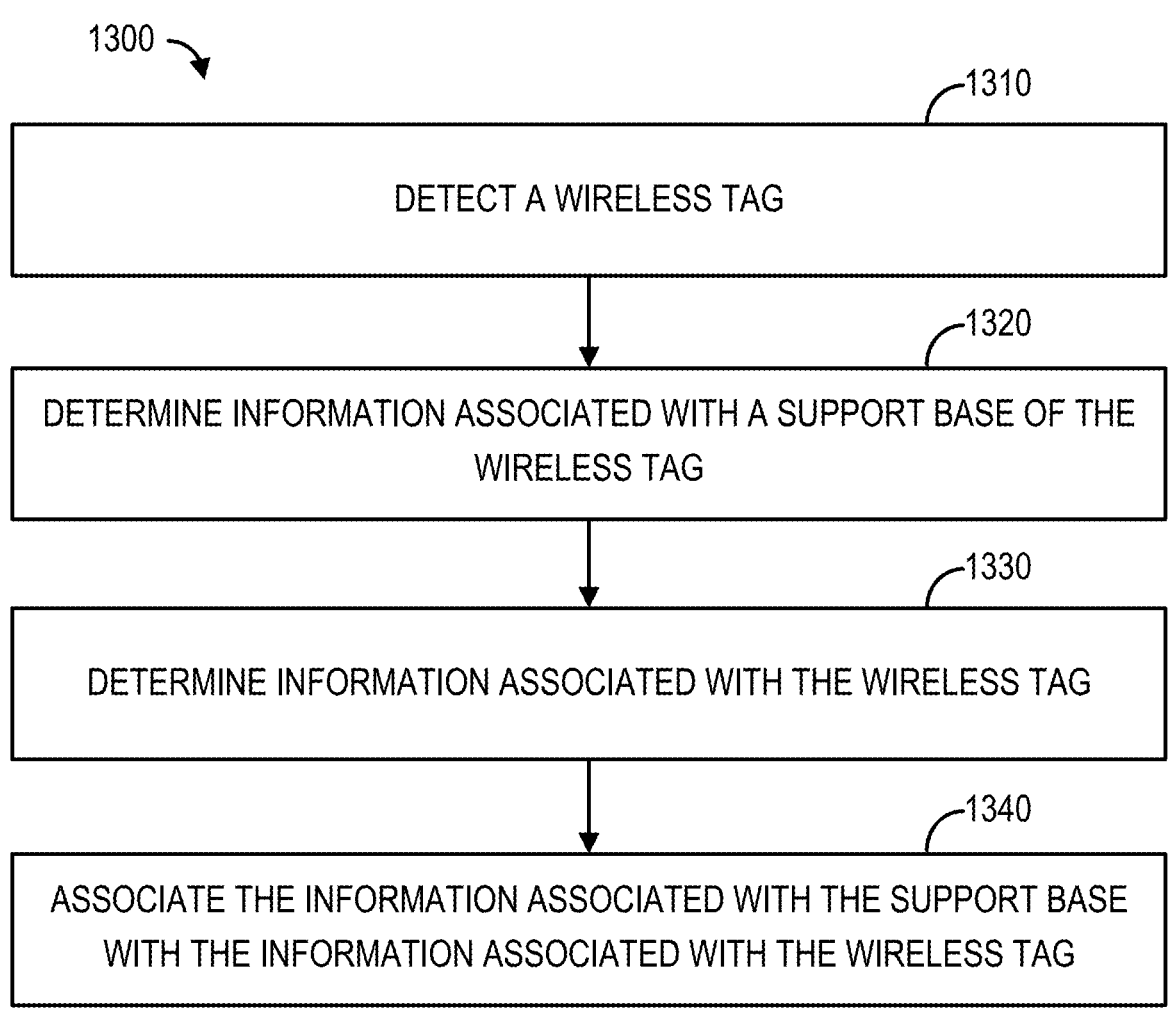
FIG. 13 shows a flowchart of an example method.

FIG. 13 shows an example method 1300 for associated wireless tag information with RFID label information. The method 1300 may be completed by the system 100 of FIG. 1. At 1310, a wireless tag may be received or detected. For example, the wireless tag may be received or detected from a roll of wireless tags 102. For example, the wireless tag may be received or detected by one or more optical scanners 120A-B of the system 100. The wireless tag may comprise an RFID tag. For example, the wireless tag may be the wireless tag 602 of FIGS. 6A-B.

At 1320, label information 614 associated with the wireless tag 602 may be determined. For example, the label information 614 may be determined by the optical scanner 120A. For example, the wireless tag 602 may comprise label information 614. For example, the label information 614 may be printed on a surface of the wireless tag 602 by the printer head 108 of FIG. 1. For example, the label information 614 may be printed on the top surface 616 of the wireless tag 602 (e.g., the top surface of the support base 604). The label information 614 may comprise the label ID. The label ID may be a unique identifier of the support base 604 that is different from label IDs for other support bases of other wireless tags. For example, the label information 614 may be an alphanumeric code, QR code, bar code, or any other 2-dimensional code. The optical scanner 120A may determine, detect or identify the label information 614 on the wireless tag 602 (e.g., on the top surface of the support base 604). The optical scanner 120A may send or transmit the determined, detected, or identified label information 614 to the computing device 114.

At 1330, tag information associated with the wireless tag 602 may be determined. For example, the tag information may be associated with the circuit 606. For example, the tag information may be unique for each circuit 606 the plurality of wireless tags 102. For example, the tag information may be determined by one of the optical scanners 120A-B of the system 100. For example, the tag information may comprise an indicia of a tag ID 615. The wireless tag 602 may comprise the indicia of a tag ID 615 for the circuit 606. For example, the indicia of the tag ID 615 may be provided along a top surface 616 of the wireless tag 602 (e.g., along a top surface of the support base 604). For example, the indicia 615 may comprise dots, dashes, lines, a QR code, a bar code, alphanumeric characters or any other types of markings. The system 100 (e.g., the optical scanner 120A) may be configured to detect the indicia of the tag ID 615. The optical scanner may send or transmit the indicia of the tag ID 615 to the computing device 114. The computing device 114 may determine the tag ID based on the indicia of the tag ID 615.

For example, the backing layer 622 of the wireless tag 602 may comprise one or more holes or openings 626 whereby a portion of the adhesive layer 620 is not covered by the backing layer 622. For example, the holes or openings 626 may be aligned along a longitudinal axis of the wireless tag 602. For example, the holes or openings 626 may be detected by the system 100 (e.g., the optical scanner 120B). For example, the size and/or spacing of the openings and the area between those openings 626 may operate as a binary information system for the computing device 114. For example, an opening 626 in the backing layer 622 may indicate a first binary value (e.g., 0 or 1) and no opening in the backing layer 622 may indicate a second binary value (e.g., the other of 0 or 1). For example, a first size of an opening 626 in the backing layer 622 may indicate a first binary value (e.g., 0 or 1) and a second size of an opening in the backing layer 622 may indicate a second binary value (e.g., the other of 0 or 1). For example, the optical scanner 120B may provide information about the one or more holes or openings 626 to the computing device 114.

The computing device 114, based on the one or more holes or openings 626, may determine information associated with the circuit 606 and/or the wireless tag 602. For example, the information may comprise the tag ID and/or the label information (e.g., label ID).

At 1340, the label information 615 may be associated with information associated with the circuit (e.g., the tag ID). For example, the label information 615 may be associated with the tag information by the computing device 114. For example, the computing device may associate the tag ID with the label information 614 (e.g., label ID) in a database associated with the computing device 114.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A wireless tag, comprising:
a substrate;
a circuit board disposed on the substrate;
an antenna disposed on the substrate and communicably coupled to the circuit board;
a power source disposed on the substrate; and
a power activation circuit comprising a circuit trace having a first end and a distal second end, wherein each of the first end and the second end are electrically coupled to the circuit board and wherein at least a portion of the circuit trace extends to an adjacent wireless tag.

2. The wireless tag of claim 1, wherein the power source is configured to provide electrical power to the circuit board when the wireless tag is detached from the adjacent wireless tag.

3. The wireless tag of claim 1, wherein the power activation circuit comprises a closed circuit when the wireless tag is attached to the adjacent wireless tag and the power activation circuit comprises an open circuit when the wireless tag is detached from the adjacent wireless tag.

4. The wireless tag of claim 1, further comprising a sensor communicably coupled to the circuit board, wherein the sensor is configured to receive programming instructions associated with the circuit board.

5. The wireless tag of claim 1, wherein the wireless tag further comprises a support base comprising a top surface and a bottom surface, wherein the bottom surface comprises an adhesive layer.

6. The wireless tag of claim 5, wherein the support base comprises a radio frequency identification label.

7. The wireless tag of claim 1, further comprising a plurality of programming contacts, wherein each programming contact of the plurality of programming contacts is electrically coupled to the circuit board.

8. The wireless tag of claim 7, wherein the plurality of programming contacts are configured to provide programming instructions associated with the circuit board.

9. The wireless tag of claim 1, further comprising a wireless tag identifier disposed along a surface of the wireless tag.

10. The wireless tag of claim 1, further comprising a programming contact comprising:
a first contact;
a second contact; and
a spring disposed between the first contact and the second contact,
wherein the programming contact is configured to provide programming instructions associated with the circuit board.

11. The wireless tag of claim 1, further comprising a support base, wherein the substrate is disposed along a top side of the support base and wherein the support base comprises:
an adhesive layer disposed along a bottom surface of the support base; and
a backing layer covering at least a portion of the adhesive layer,
wherein the backing layer comprises a plurality of openings configured to identify the wireless tag.

12. A wireless tag carrier, comprising:
a first wireless tag comprising a first support base, an antenna, and a power source:
a second wireless tag comprising a second support base coupled to the first support base and a second antenna; and
a power activation circuit comprising a circuit trace extending from the first wireless tag to the second support base.

13. The wireless tag carrier of claim 12, wherein the power source is configured to provide power to the first wireless tag when the first support base is detached from the second support base.

14. The wireless tag carrier of claim 12, wherein the power activation circuit is configured to open when the first support base is detached from the second support base and wherein the open power activation circuit allows the power source to supply electrical power to the first wireless tag.

15. The wireless tag carrier of claim 12, wherein the power source comprises a battery.

16. The wireless tag carrier of claim 12, wherein the first support base further comprises a plurality of programming contacts, wherein each programming contact of the plurality of programming contacts is electrically coupled to a circuit of the first wireless tag, wherein the plurality of programming contacts are configured to provide programming instructions associated with the first wireless tag.

17. The wireless tag carrier of claim 12, wherein the first wireless tag further comprises a sensor communicably coupled to a circuit of the first wireless tag, wherein the sensor is configured to receive programming instructions associated with the first wireless tag.

18. A method comprising:
receiving a first radio frequency identification (RFID) tag coupled to a second RFID tag, wherein the first RFID tag comprises:
a battery configured to provide power to the first RFID tag;
detaching the first RFID tag from the second RFID tag; and causing, based on detaching the first RFID tag from the second RFID tag, the battery to provide power to the first RFID tag.

19. The method of claim 18, wherein the first RFID tag further comprises a power activation circuit extending from the first RFID tag to the second RFID tag, the method further comprising:

opening, based on detaching the first RFID tag from the second RFID tag, the power activation circuit, wherein causing the battery to provide power to the first RFID tag is further based on opening the power activation circuit.

20. The method of claim 18, wherein the first RFID tag further comprises a sensor, the method further comprising:

receiving by the sensor, one or more inputs; and programming, based on the one or more inputs, the first RFID tag.

* * * * *